United States Patent
Kim et al.

(10) Patent No.: US 12,487,475 B2
(45) Date of Patent: Dec. 2, 2025

(54) WEARABLE ELECTRONIC DEVICE INCLUDING ANTENNA

(71) Applicant: SAMSUNG ELECTRONICS CO., LTD., Suwon-si (KR)

(72) Inventors: Jaehyung Kim, Suwon-si (KR); Seunghwan Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 498 days.

(21) Appl. No.: 17/980,109

(22) Filed: Nov. 3, 2022

(65) Prior Publication Data
US 2023/0147580 A1 May 11, 2023

Related U.S. Application Data

(63) Continuation of application No. PCT/KR2022/016576, filed on Oct. 27, 2022.

(30) Foreign Application Priority Data

Nov. 9, 2021 (KR) .................. 10-2021-0153425

(51) Int. Cl.
G02C 11/00 (2006.01)
G02C 5/02 (2006.01)
(Continued)

(52) U.S. Cl.
CPC ............... G02C 11/10 (2013.01); G02C 5/02 (2013.01); G02C 5/14 (2013.01); H01Q 1/273 (2013.01)

(58) Field of Classification Search
CPC . G02C 11/10; G02C 5/02; G02C 5/14; H01Q 1/273
(Continued)

(56) References Cited

U.S. PATENT DOCUMENTS 9,024,830 B2   5/2015   Okajima et al.
10,374,294 B2  8/2019   Hiramatsu
(Continued)

FOREIGN PATENT DOCUMENTS

CN   209448018   9/2019
CN   212515265   2/2021
(Continued)

OTHER PUBLICATIONS

Search Report dated Feb. 6, 2023 in International Patent Application No. PCT/KR2022/016576.
(Continued)

Primary Examiner — Stephone B Allen
Assistant Examiner — Boutsikaris Leonidas
(74) Attorney, Agent, or Firm — Nixon & Vanderhye, P.C.

(57) ABSTRACT

An example wearable electronic device including an antenna may include: a bridge; a first rim disposed in a first direction of the bridge, and a second rim disposed in a second direction of the bridge opposite to the first direction; and a first temple configured to be folded or unfolded with respect to the first rim using a first hinge, and a second temple configured to be folded or unfolded with respect to the second rim using a second hinge, wherein the first temple may include a first cut-off portion, and a first conductive portion and a second conductive portion separated by the first segmenting portion, wherein the second temple may include a second segmenting portion, and a third conductive portion and a fourth conductive portion separated by the second segmenting portion, and wherein the first conductive portion may include a printed circuit board on which a wireless communication circuit is disposed, a feeding point electrically connected to the wireless communication circuit, and at least one conductive connection member electrically (Continued)

connecting the first conductive portion and the second conductive portion.

19 Claims, 35 Drawing Sheets

(51) Int. Cl.
   *G02C 5/14* (2006.01)
   *H01Q 1/27* (2006.01)

(58) Field of Classification Search
   USPC .......................................................... 351/158
   See application file for complete search history.

(56) References Cited

U.S. PATENT DOCUMENTS

| | | |
|---|---|---|
| 2014/0194078 A1 | 7/2014 | Hikino |
| 2014/0253866 A1* | 9/2014 | Carabajal ............. G02B 27/017 |
| | | 351/123 |
| 2019/0196227 A1* | 6/2019 | Moore ................... H01Q 1/273 |
| 2021/0149224 A1* | 5/2021 | Zhang ................... G02C 11/10 |

FOREIGN PATENT DOCUMENTS

| | | |
|---|---|---|
| CN | 213023808 U | 4/2021 |
| KR | 10-2015-0003711 | 1/2015 |

OTHER PUBLICATIONS

Written Opinion dated Feb. 6, 2023 in International Patent Application No. PCT/KR2022/016576.
Extended Search Report dated Dec. 11, 2024 in European Patent Application No. 22893081.4.

* cited by examiner

WEARABLE ELECTRONIC DEVICE INCLUDING ANTENNA

CROSS-REFERENCE TO RELATED APPLICATIONS

This application is a continuation of International Application No. PCT/KR2022/016576 designating the United States, filed on Oct. 27, 2022, in the Korean Intellectual Property Receiving Office and claiming priority to Korean Patent Application No. 10-2021-0153425, filed on Nov. 9, 2021, in the Korean Intellectual Property Office, the disclosures of which are incorporated by reference herein in their entireties.

BACKGROUND

Field

The disclosure relates to a wearable electronic device including an antenna.

Description of Related Art

Wearable electronic devices are evolving into various forms such as augmented reality (AR) glasses in the form of glasses or head mounted displays (HMDs).

Such a wearable electronic device may transmit and receive various data to and from another electronic device through wireless communication.

The wearable electronic device may include at least one antenna (e.g., conductive pattern) to perform wireless communication with another electronic device.

SUMMARY

Wearable electronic devices may include augmented reality (AR) glasses or smart glasses in the form of glasses that implement (provide) various contents on transparent glasses (e.g., lenses).

Such a wearable electronic device may be configured such that rims (e.g., frame front) and temples (e.g., arms) are connected using hinges and the temples are folded or unfolded with respect to the rims.

In the wearable electronic device, at least some of the temples may include a conductive material (e.g., metal) and may be used as an antenna (e.g., antenna radiator) for performing wireless communication.

For example, the temples of the wearable electronic device may use conductive portions separated by at least one segmenting portion (e.g., slit) as at least one antenna.

In a state in which the rims and the temples are folded in the wearable electronic device, when the cut-off portion formed in one temple is adjacent to a part of the other temple (or rim) made of a conductive material, radiation performance of the antenna may be reduced.

Various embodiments of the disclosure may provide a wearable electronic device that can reduce antenna performance degradation when the rims and the temples are in a folded state.

The aspects, features, and advantages of various embodiments are not limited to those mentioned above, and other aspects, features, and advantages not mentioned will be understood from the following description.

A wearable electronic device according to various example embodiments of the disclosure may include: a bridge; a first rim disposed in a first direction of the bridge, and a second rim disposed in a second direction of the bridge opposite to the first direction; and a first temple configured to be folded or unfolded with respect to the first rim using a first hinge, and a second temple configured to be folded or unfolded with respect to the second rim using a second hinge, wherein the first temple may include a first cut-off portion, and a first conductive portion and a second conductive portion separated by the first cut-off portion, wherein the second temple may include a second cut-off portion, and a third conductive portion and a fourth conductive portion separated by the second cut-off portion, and wherein the first conductive portion may include a printed circuit board on which a wireless communication circuit is disposed, a feeding point electrically connected to the wireless communication circuit, and at least one conductive connection member electrically connecting the first conductive portion and the second conductive portion.

A wearable electronic device according to various example embodiments of the disclosure may include: a bridge; a first rim disposed in a first direction of the bridge, and a second rim disposed in a second direction of the bridge opposite to the first direction; a first end piece coupled to a portion of the first rim, and a second end piece coupled to a portion of the second rim; and a first temple coupled to the first end piece so as to be folded or unfolded with respect to the first rim using a first hinge, and a second temple coupled to the second end piece so as to be folded or unfolded with respect to the second rim using a second hinge, wherein the first temple may include a second conductive portion formed using a first segmenting portion, wherein the first rim and the first end piece may include a first conductive portion formed using a second segmenting portion formed in a first direction of the first rim and a third segmenting portion formed in a second direction, and wherein the second conductive portion may include a printed circuit board on which a wireless communication circuit is disposed, a feeding point electrically connected to the wireless communication circuit, and at least one conductive connection member electrically connecting the second conductive portion and the first conductive portion.

According to various example embodiments of the disclosure, a wearable electronic device capable of reducing antenna performance deterioration may be provided by arranging the cut-off portions to overlap each other when the rims and the temples are in a folded state.

In addition, it is possible to provide various effects directly or indirectly identified through this document.

BRIEF DESCRIPTION OF THE DRAWINGS

In connection with the description of the drawings, the same or similar reference symbols may be used for the same or similar components.

The above and other aspects, features and advantages of certain embodiments of the present disclosure will be more apparent from the following detailed description, taken in conjunction with the accompanying drawings, in which.

DETAILED DESCRIPTION

Figure 1:
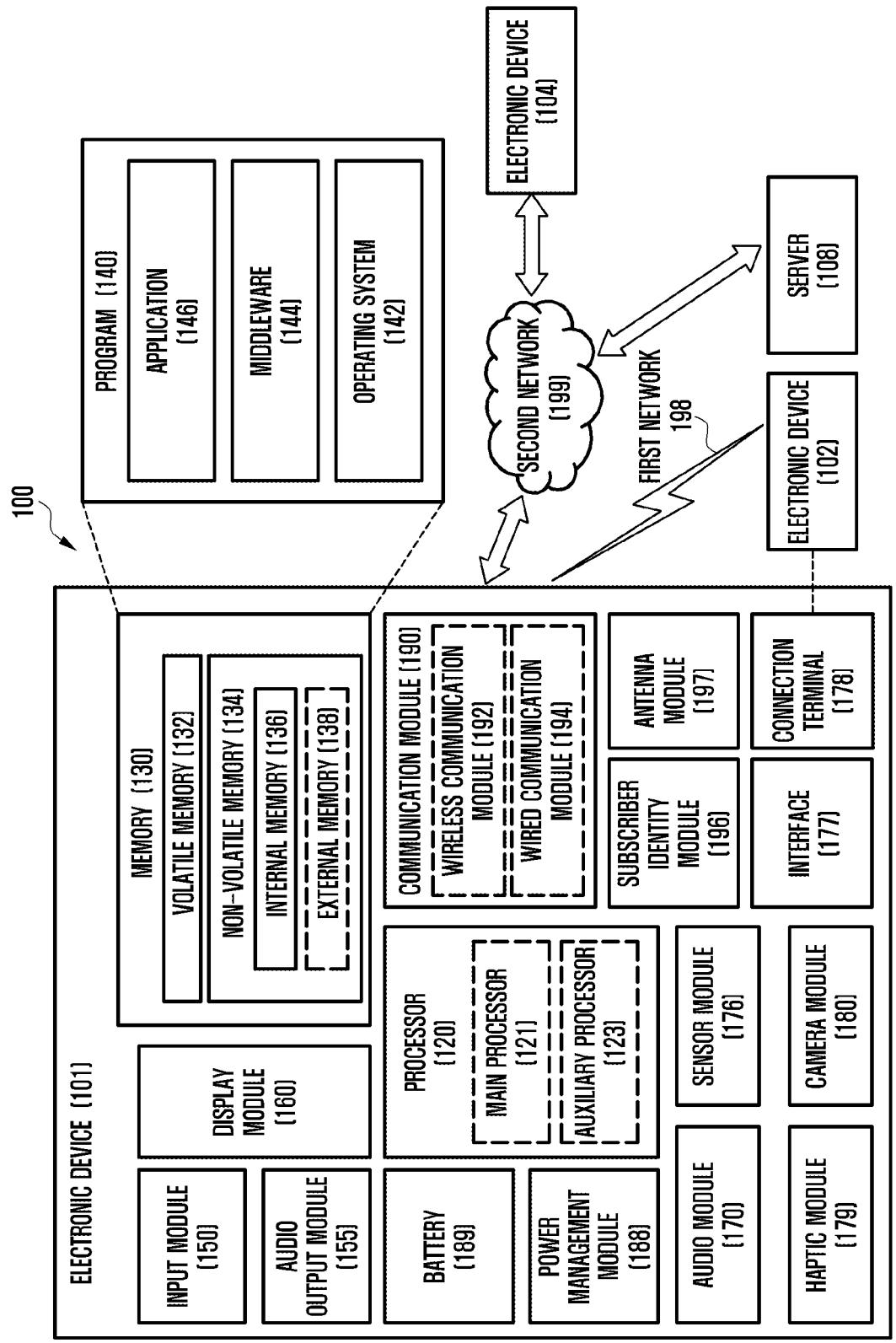
FIG. 1 is a block diagram of an example electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, an audio output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The audio output module 155 may output sound signals to the outside of the electronic device 101. The audio output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Figure 2:
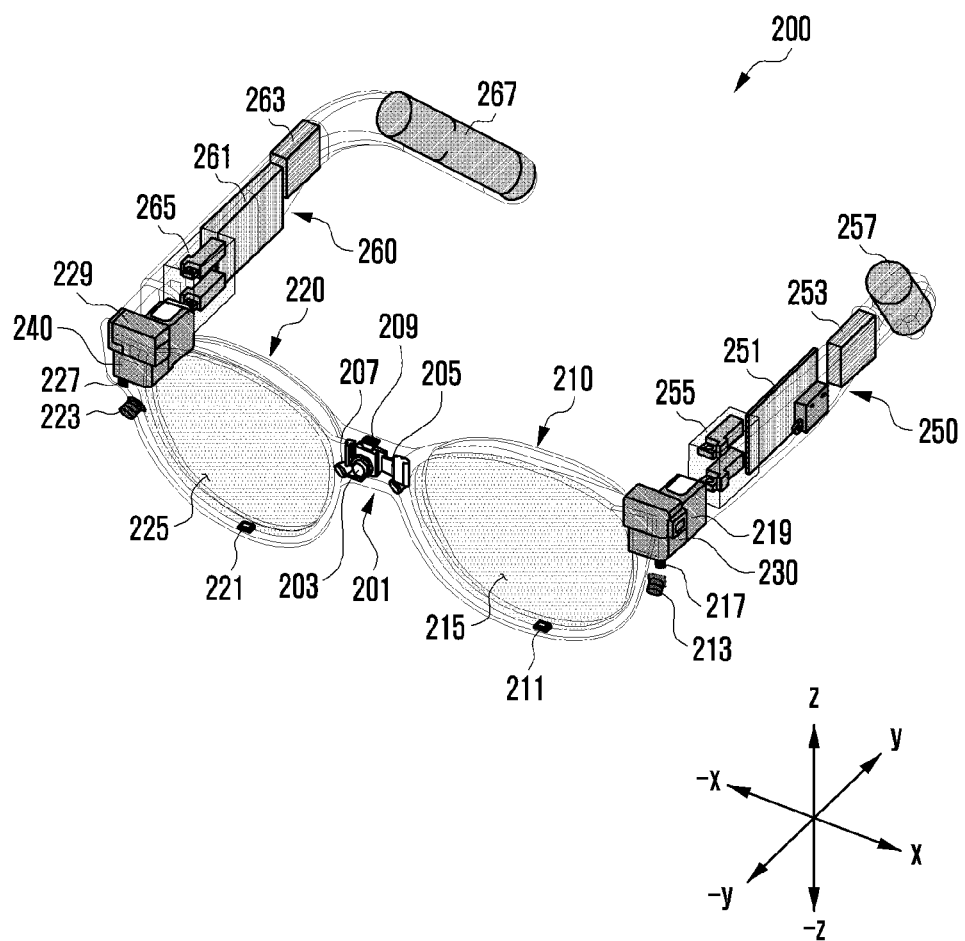
FIG. 2 is a perspective view schematically illustrating the configuration of an example wearable electronic device according to various embodiments.

FIG. 2 is a perspective view schematically illustrating a configuration of an example wearable electronic device according to various embodiments.

The wearable electronic device 200 of FIG. 2 may include the components described for the electronic device 101 of FIG. 1. The wearable electronic device 200 may include augmented reality (AR) glasses or smart glasses in the form of eyeglasses.

With reference to FIG. 2, the wearable electronic device 200 according to various embodiments may include a bridge 201, a first rim 210, a second rim 220, a first end piece 230, a second end piece 240, a first temple 250, and/or a second temple 260.

According to an embodiment, the bridge 201 may connect the first rim 210 and the second rim 220. The bridge 201 may be placed on the user's nose when the user wears the wearable electronic device 200. The bridge 201 may separate the first rim 210 and the second rim 220 with respect to the user's nose.

According to various embodiments, the bridge 201 may include a camera module 203, a first eye-tracking camera 205, a second eye-tracking camera 207 and/or an audio module 209.

According to various embodiments, the camera module 203 (e.g., camera module 180 in FIG. 1) may capture the front (e.g., negative y-axis direction) of the user (e.g., user of the wearable electronic device 200) to obtain image data. The camera module 203 may capture an image corresponding to the user's field of view (FoV) or measure a distance to a subject (e.g., object). The camera module 203 may include an RGB camera, a high resolution (HR) camera, and/or a photo video (PV) camera. To obtain a high-quality image, the camera module 203 may include a color camera having an auto focus (AF) function and an optical image stabilization (OIS) function.

According to various embodiments, the first eye-tracking camera 205 and the second eye-tracking camera 207 may identify the user's gaze. The first eye-tracking camera 205 and the second eye-tracking camera 207 may photograph the user's pupils in a direction opposite to the photographing direction of the camera module 203. For example, the first eye-tracking camera 205 may partially photograph the user's left eye, and the second eye-tracking camera 207 may partially photograph the user's right eye. The first eye-tracking camera 205 and the second eye-tracking camera 207 may detect the user's pupils (e.g., left and right eyes) to track the gaze direction. The tracked gaze direction may be used to move the center of a virtual image including a virtual object in correspondence to the gaze direction. The first eye-tracking camera 205 and/or the second eye-tracking camera 207 may track the user's gaze using at least one method among, for example, EOG sensor (electrooculography or electrooculogram), coil system, dual Purkinje system, bright pupil system, or dark pupil system.

According to various embodiments, the audio module 209 (e.g., audio module 170 in FIG. 1) may be disposed between the first eye-tracking camera 205 and the second eye-tracking camera 207. The audio module 209 may convert a user's voice into an electrical signal or convert an electrical signal into a sound. The audio module 209 may include a microphone.

According to an embodiment, the first rim 210 and the second rim 220 may constitute the frame (e.g., glasses frame) of the wearable electronic device 200 (e.g., AR glasses). The first rim 210 may be disposed in a first direction (e.g., x-axis direction) of the bridge 201. The first rim 210 may be disposed at a position corresponding to the user's left eye. The second rim 220 may be disposed in a second direction (e.g., negative x-axis direction) of the bridge 201 opposite to the first direction (e.g., x-axis direction). The second rim 220 may be disposed at a position corresponding to the user's right eye. The first rim 210 and the second rim 220 may be made of a conductive material (e.g., metal) and/or a non-conductive material (e.g., polymer).

According to various embodiments, the first rim 210 may surround and support at least some of a first glass 215 (e.g., first display) disposed on the inner circumferential surface. The first glass 215 may be placed in front of the user's left eye. The second rim 220 may surround and support at least some of a second glass 225 (e.g., second display) disposed on the inner circumferential surface. The second glasses 225 may be placed in front of the user's right eye. The user of the wearable electronic device 200 may see the foreground (e.g., actual image) of an external object (e.g., subject) through the first glass 215 and the second glass 225. The wearable electronic device 200 may implement augmented reality by displaying a virtual image in a superimposed way on the foreground (e.g., real image) of an external object.

According to various embodiments, the first glass 215 and the second glass 225 may include a projection-type transparent display. The first glass 215 and the second glass 225 may each form a reflective surface as a transparent plate (or transparent screen), and the image generated by the wearable electronic device 200 may be reflected by the reflective surfaces (e.g., total internal reflection) and be incident to the user's left eye and right eye. In one embodiment, the first glass 215 may include an optical waveguide that transmits the light generated from a light source of the wearable electronic device 200 to the left eye of the user. For example, the optical waveguide may be made of glass, plastic, or a polymer material, and may include a nano-pattern (e.g., polygonal or curved grating structure or mesh structure) formed on the inside or surface of the first glass 215. The optical waveguide may include at least one of one or more diffractive elements (e.g., diffractive optical element (DOE), holographic optical element (HOE)) or reflective elements (e.g., reflective minor). The optical waveguide may guide the display light emitted from the light source to the user's eye using at least one diffractive element or reflective element included in the optical waveguide. In various embodiments, the diffractive element may include an input/output optical member, and the reflective element may include total internal reflection (TIR). For example, the light emitted from the light source may be guided to the optical waveguide through the input optical member, and the light moving inside the optical waveguide may be guided toward the user's eye through the output optical member. The second glass 225 may be implemented in substantially the same manner as the first glass 215.

According to various embodiments, the first glass 215 and the second glass 225 may include, for example, liquid crystal display (LCD), digital mirror device (DMD), liquid crystal on silicon (LCoS), organic light emitting diode (OLED), or micro light emitting diode (micro LED). Although not shown, when the first glass 215 and the second glass 225 are made of one of liquid crystal display, digital mirror device, and liquid crystal on silicon, the wearable electronic device 200 may include a light source irradiating light to the screen output area of the first glass 215 and the second glass 225. In an embodiment, when the first glass 215 and the second glass 225 can generate light by themselves, for example, when they are made of one of organic light emitting diodes or micro LEDs, the wearable electronic device 200 may provide a virtual image of good quality to the user even if it does not include a separate light source.

According to various embodiments, the first rim 210 may include a first microphone 211, a first recognition camera 213, a first light emitting element 217, and/or a first display module 219. The second rim 220 may include a second microphone 221, a second recognition camera 223, a second light emitting element 227, and/or a second display module 229.

According to various embodiments, the first light emitting element 217 and the first display module 219 may be included in the first end piece 230, and the second light emitting element 227 and the second display module 229 may be included in the second end piece 240.

According to various embodiments, the first microphone 211 and/or the second microphone 221 may receive the user's voice of the wearable electronic device 200 and convert it into an electrical signal.

According to various embodiments, the first recognition camera 213 and/or the second recognition camera 223 may recognize the surrounding space of the wearable electronic device 200. The first recognition camera 213 and/or the second recognition camera 223 may detect a user's gesture within a specific distance (e.g., specific space) from the wearable electronic device 200. The first recognition camera 213 and/or the second recognition camera 223 may include a global shutter (GS) camera capable of reducing a rolling shutter (RS) phenomenon to detect and track the user's rapid hand movements and/or minute movements of the fingers. The wearable electronic device 200 may detect the eyes corresponding to the dominant eye and/or the non-dominant eye among the user's left and/or right eyes using the first eye-tracking camera 205, the second eye-tracking camera 207, the first recognition camera 213 and/or the second recognition camera 223. For example, the wearable electronic device 200 may detect the eye corresponding to the dominant eye and/or the non-dominant eye based on a user's gaze direction with respect to an external object or a virtual object.

According to various embodiments, the first light emitting element 217 and/or the second light emitting element 227 may emit light to increase the accuracy of the camera module 203, the first eye-tracking camera 205, the second eye-tracking camera 207, the first recognition camera 213, and/or the second recognition camera 223. The first light emitting element 217 and/or the second light emitting element 227 may be used for increasing the accuracy when photographing the user's pupils using the first eye-tracking camera 205 and/or the second eye-tracking camera 207. When photographing a user's gesture using the first recognition camera 213 and/or the second recognition camera 223, the first light emitting element 217 and/or the second light emitting element 227 may be used if it is difficult to detect the object to be photographed (e.g., subject) owing to a dark environment, mixing of various light sources, or reflected light. The first light emitting element 217 and/or the second light emitting element 227 may include, for example, an LED, an IR LED, or a xenon lamp.

According to various embodiments, the first display module 219 and/or the second display module 229 may emit light and transmit it to the left eye and/or right eye of the user using the first glass 215 and/or the second glass 225. The first glass 215 and/or the second glass 225 may display various image information using the light emitted through the first display module 219 and/or the second display module 229. The first display module 219 and/or the second display module 229 may include the display module 160 in FIG. 1. The wearable electronic device 200 may display the foreground of an external object and an image emitted through the first display module 219 and/or the second display module 229 in a superimposed way via the first glass 215 and/or the second glass 225.

According to an embodiment, the first end piece 230 may be coupled to a portion (e.g., x-axis direction) of the first rim 210. The second end piece 240 may be coupled to a portion (e.g., negative x-axis direction) of the second rim 220. In various embodiments, the first light emitting element 217 and the first display module 219 may be included in the first end piece 230. The second light emitting element 227 and the second display module 229 may be included in the second end piece 240.

According to various embodiments, the first end piece 230 may connect the first rim 210 and the first temple 250. The second end piece 240 may connect the second rim 220 and the second temple 260.

According to an embodiment, the first temple 250 may be operably connected to the first end piece 230 using the first hinge 255. The first hinge 255 may be rotatably configured so that the first temple 250 is folded or unfolded with respect to the first rim 210. The first temple 250 may extend along the left side of the user's head, for example. The tip portion (e.g., y-axis direction) of the first temple 250 may be bent to be supported by, for example, the user's left ear when the user is wearing the wearable electronic device 200. The second temple 260 may be operably connected to the second end piece 240 using the second hinge 265. The second hinge 265 may be rotatably configured so that the second temple 260 is folded or unfolded with respect to the second rim 220. The second temple 260 may extend along the right side of the user's head, for example. The tip portion (e.g., y-axis direction) of the second temple 260 may be bent to be supported by, for example, the user's right ear when the user is wearing the wearable electronic device 200.

According to various embodiments, the first temple 250 may include a first printed circuit board 251, a first sound output module 253 (e.g., sound output module 155 in FIG. 1), and/or a first battery 257 (e.g., battery 189 in FIG. 1). The second temple 260 may include a second printed circuit board 261, a second sound output module 263 (e.g., sound output module 155 in FIG. 1), and/or a second battery 267 (e.g., battery 189 in FIG. 1).

According to various embodiments, various electronic components (e.g., at least some of the components included in the electronic device 101 in FIG. 1) such as the processor 120, the memory 130, the interface 177 and/or the wireless communication module 192 shown in FIG. 1 may be mounted on the first printed circuit board 251 and/or the second printed circuit board 261. The processor may include at least one of, for example, a central processing unit, an application processor, a graphics processing unit, an image signal processor, a sensor hub processor, or a communication processor. The first printed circuit board 251 and/or the second printed circuit board 261 may include, for example, a printed circuit board (PCB), a flexible PCB (FPCB), or a rigid-flexible PCB (RFPCB). In an embodiment, the first printed circuit board 251 and/or the second printed circuit board 261 may include a main PCB, a slave PCB disposed to be partially overlapped with the main PCB, and/or an interposer substrate between the main PCB and the slave PCB. The first printed circuit board 251 and/or the second printed circuit board 261 may be electrically connected to other components (e.g., camera module 203, first eye-tracking camera 205, second eye-tracking camera 207, audio module 209, first microphone 211, first recognition camera 213, first light emitting element 217, first display module 219, second microphone 221, second recognition camera 223, second light emitting element 227, second display module 229, first sound output module 253, and/or second sound output module 263) through electrical paths such as an FPCB and/or a cable. For example, the FPCB and/or cables may be disposed on at least a portion of the first rim 210, the bridge 201, and/or the second rim 220. In an embodiment, the wearable electronic device 200 may include only one of the first printed circuit board 251 or the second printed circuit board 261.

According to various embodiments, the first sound output module 253 and/or the second sound output module 263 may deliver an audio signal to the user's left ear and/or right ear. The first sound output module 253 and/or the second sound output module 263 may include, for example, a piezo speaker (e.g., bone conduction speaker) that delivers an audio signal without a speaker hole. In a certain embodiment, the wearable electronic device 200 may include only one of the first sound output module 253 and the second sound output module 263.

According to various embodiments, the first battery 257 and/or the second battery 267 may supply power to the first printed circuit board 251 and/or the second printed circuit board 261 using a power management module (e.g., power management module 188 in FIG. 1). The first battery 257 and/or the second battery 267 may include, for example, a non-rechargeable primary cell, a rechargeable secondary cell, or a fuel cell. In an embodiment, the wearable electronic device 200 may include only one of the first battery 257 and the second battery 267.

According to various embodiments, the wearable electronic device 200 may include a sensor module (e.g., sensor module 176 in FIG. 1). The sensor module (e.g., including one or more sensors) may generate an electrical signal or data value corresponding to an internal operating state of the wearable electronic device 200 or an external environmental state. The sensor module may further include at least one of, for example, a gesture sensor, a gyro sensor, an atmospheric pressure sensor, a magnetic sensor, a grip sensor, a color sensor, an infrared (IR) sensor, a biometric sensor (e.g., HRM sensor), a temperature sensor, a humidity sensor, or an illumination sensor. In an embodiment, the sensor module may recognize biometric information of the user using various biometric sensors (or biometric recognition sensors) such as an e-nose sensor, an electromyography (EMG) sensor, an electroencephalogram (EEG) sensor, an electrocardiogram (ECG) sensor, or an iris sensor.

According to various embodiments, although the wearable electronic device 200 has been described as being a device that displays augmented reality using the first glass 215 and the second glass 225 in the above description, it may also be, but is not limited to, a device that displays virtual reality (VR).

Figure 3A:
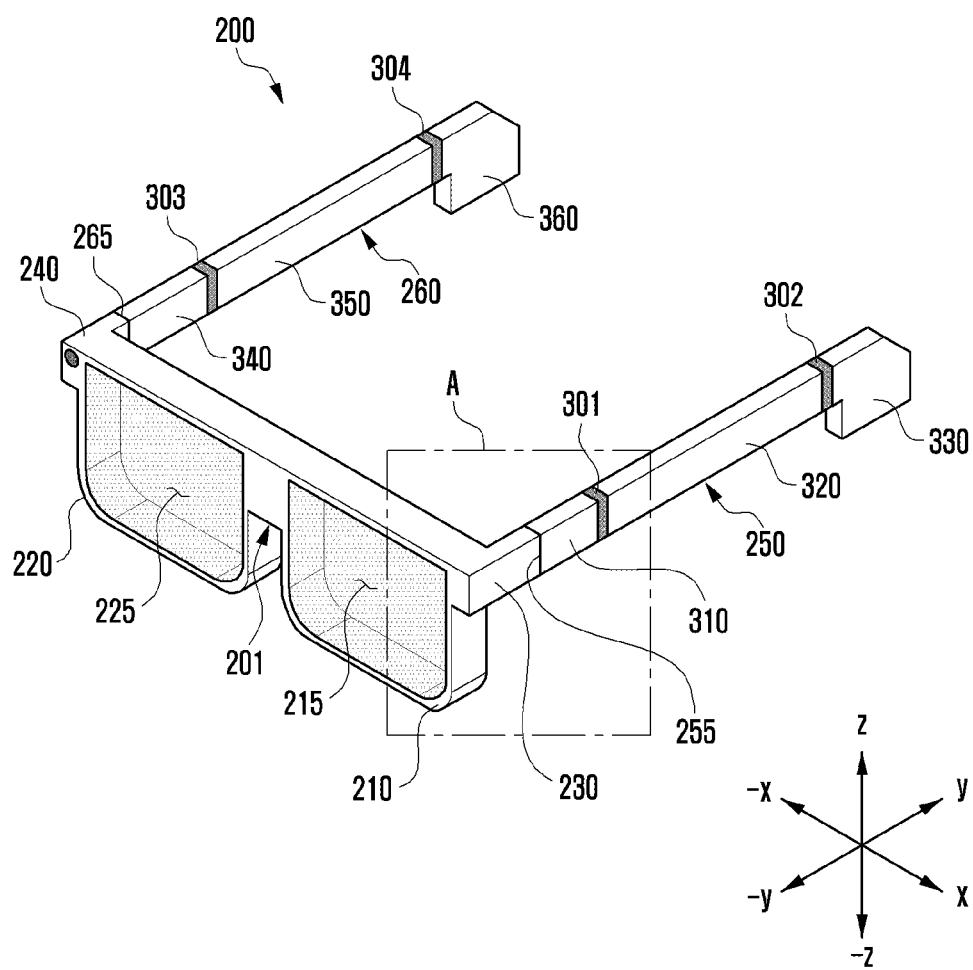
FIG. 3A is a perspective view schematically illustrating an example wearable electronic device including an antenna according to various embodiments.
Figure 3B:
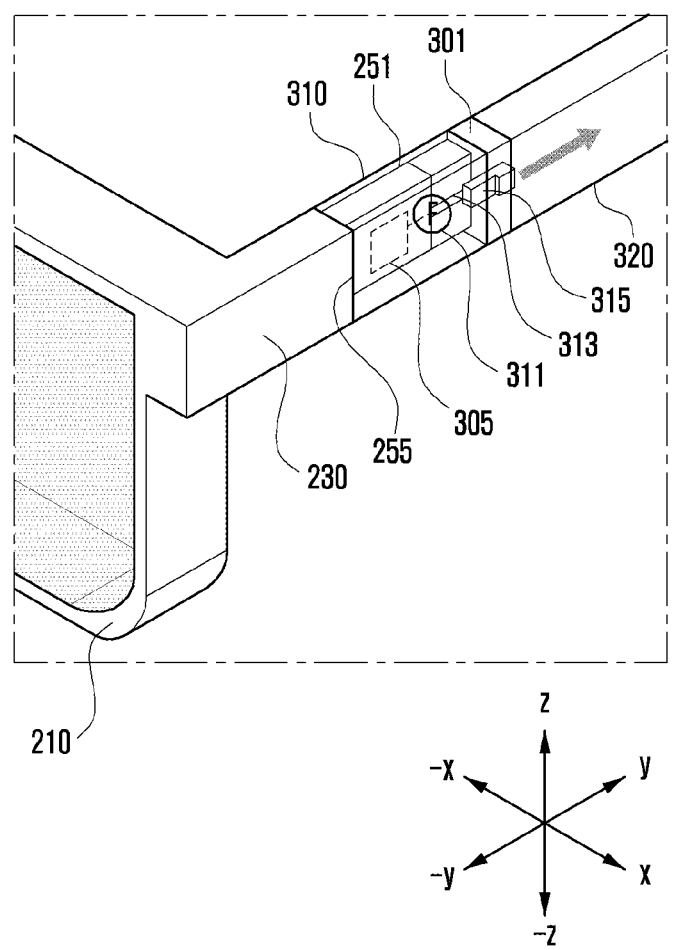
FIG. 3B is an enlarged perspective view of region A of the example wearable electronic device shown FIG. 3A according to various embodiments.

FIG. 3A is a perspective view schematically illustrating an example wearable electronic device including an antenna according to various embodiments. FIG. 3B is an enlarged perspective view of region A of the example wearable electronic device shown in FIG. 3A according to various embodiments.

The wearable electronic device 200 of FIGS. 3A and 3B may include the components described as to the wearable electronic device 200 of FIG. 2. The wearable electronic device 200 illustrated in FIGS. 3A and 3B may be a diagram illustrating only some components of the wearable electronic device 200 shown in FIG. 2. The wearable electronic device 200 shown in FIGS. 3A and 3B may be integrated into or applied to the wearable electronic device 200 in FIG. 2. In the description of FIGS. 3A and 3B, components substantially the same as those of the embodiment of the wearable electronic device 200 in FIG. 2 may be given the same reference numerals, and descriptions thereof are not repeated.

With reference to FIG. 3A, the wearable electronic device 200 according to various embodiments may include a bridge 201, a first rim 210, a second rim 220, a first end piece 230, a second end piece 240, a first temple 250, and/or a second temple 260.

According to an embodiment, the bridge 201 may connect the first rim 210 and the second rim 220. The bridge 201 may be made of a non-conductive material (e.g., polymer). The bridge 201 may have an outer edge made of a non-conductive material, and the inside thereof may include a display.

According to an embodiment, the first rim 210 and the second rim 220 may constitute the frame (e.g., glasses frame) of the wearable electronic device 200. The first rim 210 and the second rim 220 may be made of a non-conductive material (e.g., non-conductive injection material).

According to various embodiments, the first rim 210 may be disposed in a first direction (e.g., x-axis direction) of the bridge 201. The first rim 210 may be disposed around the user's left eye. The second rim 220 may be disposed in a second direction (e.g., negative x-axis direction) of the bridge 201 opposite to the first direction (e.g., x-axis direction). The second rim 220 may be disposed around the user's right eye.

According to various embodiments, the first rim 210 may surround and support at least some of a first glass 215 (e.g., first display) disposed on the inner circumferential surface. The first glass 215 may be placed in front of the user's left eye. The second rim 220 may surround and support at least some of a second glass 225 (e.g., second display) disposed on the inner circumferential surface. The second glass 225 may be placed in front of the user's right eye.

According to an embodiment, the first end piece 230 may be coupled to a portion (e.g., x-axis direction) of the first rim 210. The second end piece 240 may be coupled to a portion (e.g., negative x-axis direction) of the second rim 220. The first end piece 230 may connect the first rim 210 and the first temple 250. The second end piece 240 may connect the second rim 220 and the second temple 260.

According to an embodiment, the first temple 250 may be operably connected to the first end piece 230 using a first hinge 255. The first hinge 255 may be rotatably configured so that the first temple 250 is folded or unfolded with respect to the first rim 210. The first temple 250 may extend along the left side of the user's head, for example. The second temple 260 may be operably connected to the second end piece 240 using a second hinge (e.g., second hinge 265 in FIG. 2). The second hinge 265 may be rotatably configured so that the second temple 260 is folded or unfolded with respect to the second rim 220. The second temple 260 may extend along the right side of the user's head, for example. The first temple 250 and/or the second temple 260 may be at least partially made of a conductive material (e.g., metal).

According to an embodiment, the first temple 250 may include a first segmenting portion 301 and a second segmenting portion 302. The first temple 250 separated by the first segmenting portion 301 and the second segmenting portion 302 may include a first conductive portion 310, a second conductive portion 320, and a third conductive portion 330.

According to various embodiments, the first conductive portion 310 may be disposed between the first end piece 230 (or, first hinge 255) and the first segmenting portion 301. The second conductive portion 320 may be disposed between the first segmenting portion 301 and the second segmenting portion 302. The third conductive portion 330 may be disposed to face one end (e.g., temple tip) in one direction (e.g., y-axis direction) from the second segmenting portion 302.

According to an embodiment, the second temple 260 may include a third segmenting portion 303 and a fourth segmenting portion 304. The second temple 260 separated by the third segmenting portion 303 and the fourth segmenting portion 304 may include a fourth conductive portion 340, a fifth conductive portion 350, and a sixth conductive portion 360.

According to various embodiments, the fourth conductive portion 340 may be disposed between the second end piece 240 (or, second hinge 265) and the third segmenting portion 303. The fifth conductive portion 350 may be disposed between the third segmenting portion 303 and the fourth segmenting portion 304. The sixth conductive portion 360 may be disposed to face one end (e.g., temple tip) in one direction (e.g., y-axis direction) from the fourth segmenting portion 304.

According to various embodiments, the first segmenting portion 301, the second segmenting portion 302, the third segmenting portion 303, and the fourth segmenting portion 304 may be formed in a slit shape. The first segmenting portion 301, the second segmenting portion 302, the third segmenting portion 303, and the fourth segmenting portion 304 may be filled with a non-conductive material. The non-conductive material (e.g., non-conductive injection material) may include a dielectric (e.g., insulator) containing at least one of, for example, polycarbonate, polyimide, plastic, polymer, or ceramic.

With reference to FIG. 3B, a printed circuit board 251 (e.g., first printed circuit board 251 in FIG. 2) may be disposed inside the first conductive portion 310. The printed circuit board 251 may include a wireless communication circuit 305 (e.g., wireless communication module 192 in FIG. 1). A feeding point 311 electrically connected to the wireless communication circuit 305 may be disposed at a site of the first conductive portion 310. A first conductive connection member 315 (e.g., C clip) may be disposed at least partially inside the first segmenting portion 301. The feeding point 311 may be electrically connected to the first conductive connection member 315 and the second conductive portion 320 through a second conductive connection member 313 (e.g., wiring). Radiation from the feeding point 311 may be directed towards the second conductive portion 320. In an embodiment, as long as the feeding point 311 and the second conductive portion 320 can be electrically connected, one of the first conductive connection member 315 and the second conductive connection member 313 may be utilized. In various embodiments, although the printed circuit board 251 has been described as being disposed inside the first conductive portion 310 of the first temple 250, another printed circuit board (e.g., second printed circuit board 261 in FIG. 2) may be disposed inside the fourth conductive portion 340 of the second temple 260.

According to various embodiments, the first conductive portion 310 and the second conductive portion 320 may be electrically connected to the feeding point 311 of the wireless communication circuit 305, and may function as a first antenna radiator (e.g., first antenna) and a second antenna radiator (e.g., second antenna).

Figure 4:
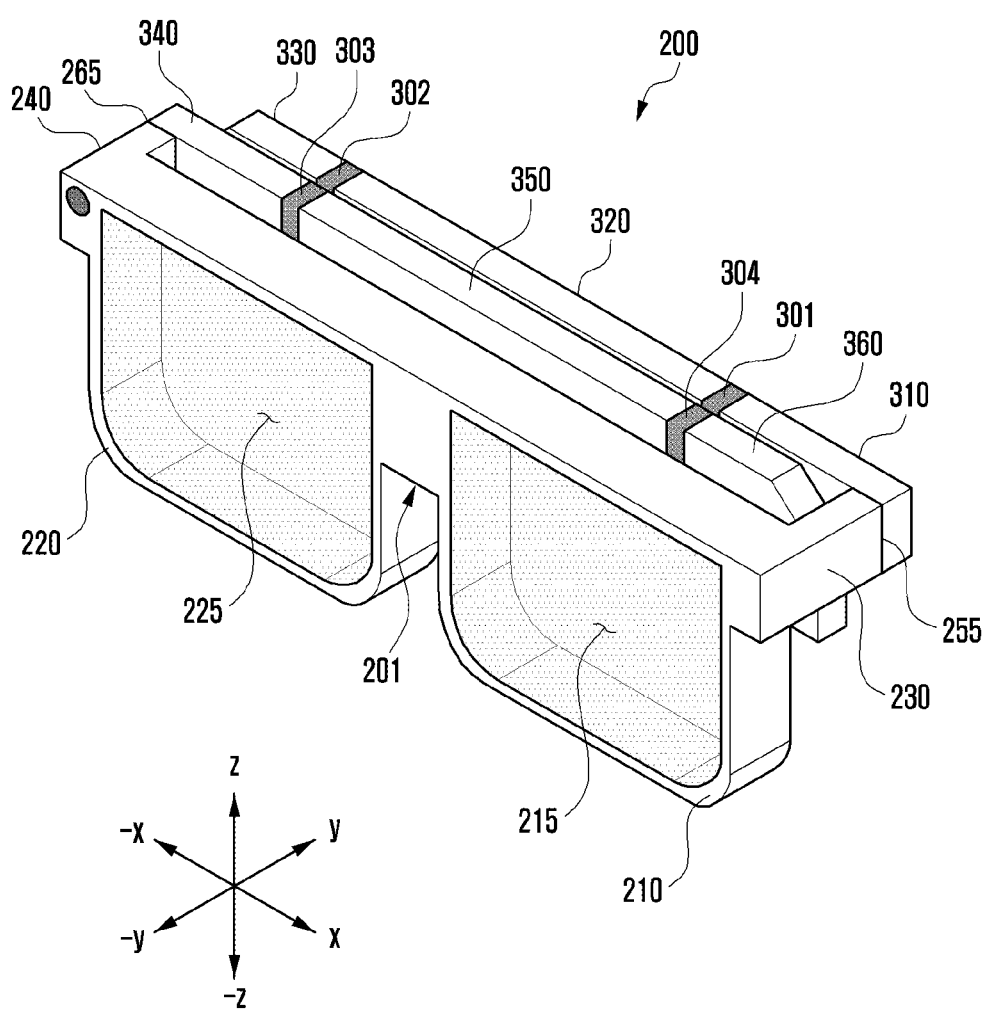
FIG. 4 is a view illustrating an example wearable electronic device in a folded state according to various embodiments.

FIG. 4 is a view illustrating an embodiment of an example wearable electronic device in a folded state according to various embodiments.

With reference to FIG. 4, the first temple 250 may be folded in a direction in which the first rim 210 is disposed (e.g., negative y-axis direction) using the first hinge 255. The second temple 260 may be folded in a direction in which the second rim 220 is disposed (e.g., negative y-axis direction) using the second hinge 265.

According to an embodiment, when the second temple 260 is folded first toward the second rim 220 and then the first temple 250 is folded toward the first rim 210, the first segmenting portion 301 may be disposed to overlap the fourth segmenting portion 304 and the second segmenting portion 302 may be disposed to overlap the third segmenting portion 303. When the first segmenting portion 301 and the fourth segmenting portion 304 overlap and the second segmenting portion 302 and the third segmenting portion 303 overlap, this may reduce radiation performance deterioration of the first conductive portion 310 (e.g., first antenna) and the second conductive portion 320 (e.g., second antenna).

Figure 5A:
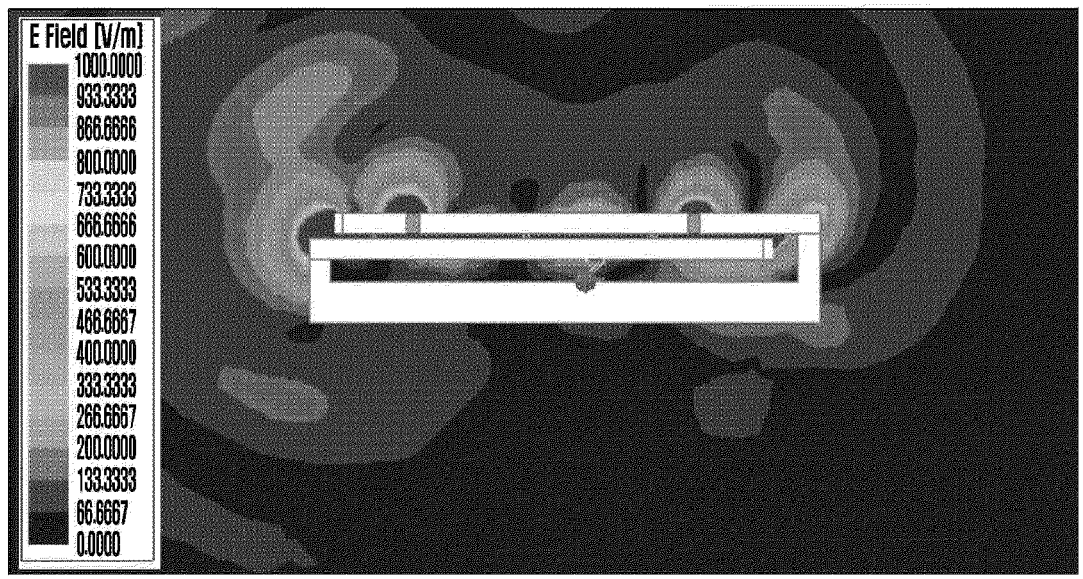
FIG. 5A is a diagram illustrating an electric field of a wearable electronic device according to a comparative example.
Figure 5B:
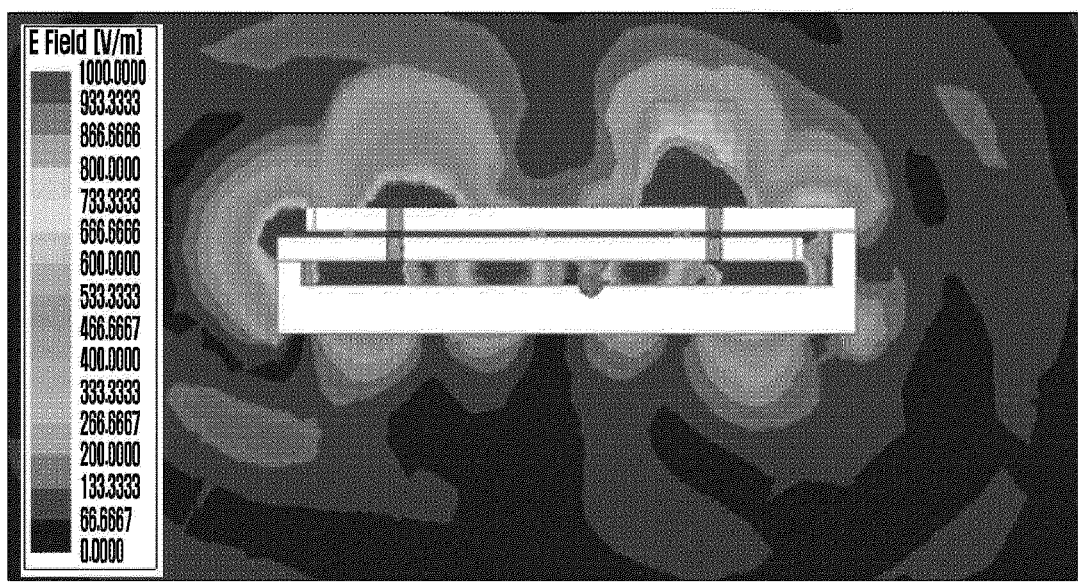
FIG. 5B is a diagram illustrating an electric field of an example wearable electronic device according to various embodiments.

FIG. 5A is a diagram illustrating an electric field of a wearable electronic device according to a comparative example, and FIG. 5B is a diagram illustrating an electric field of a wearable electronic device according to various embodiments of the disclosure.

With reference to FIG. 5A, in the wearable electronic device according to a comparative example, a segmenting portion may be formed only in the first temple and a segmenting portion may be not formed in the second temple. According to the comparative example, the strength of the electric field may be weak due to the influence of the conductive portion of the second temple on the segmenting portion formed in the first temple.

With reference to FIG. 5B, in the wearable electronic device 200 according to various embodiments of the disclosure in which the first segmenting portion 301 formed in the first temple 250 is disposed to overlap the fourth segmenting portion 304 formed in the second temple 260 and the second segmenting portion 302 formed in the first temple 250 is disposed to overlap the third segmenting portion 303 formed in the second temple 260, it can be seen that the strength of the electric field is stronger between some of the first conductive portion 310 adjacent to the first segmenting portion 301 and some of the second conductive portion 320, and between some of the second conductive portion 320 adjacent to the second segmenting portion 302 and some of the third conductive portion 330 in comparison to the comparative example.

Figure 6:
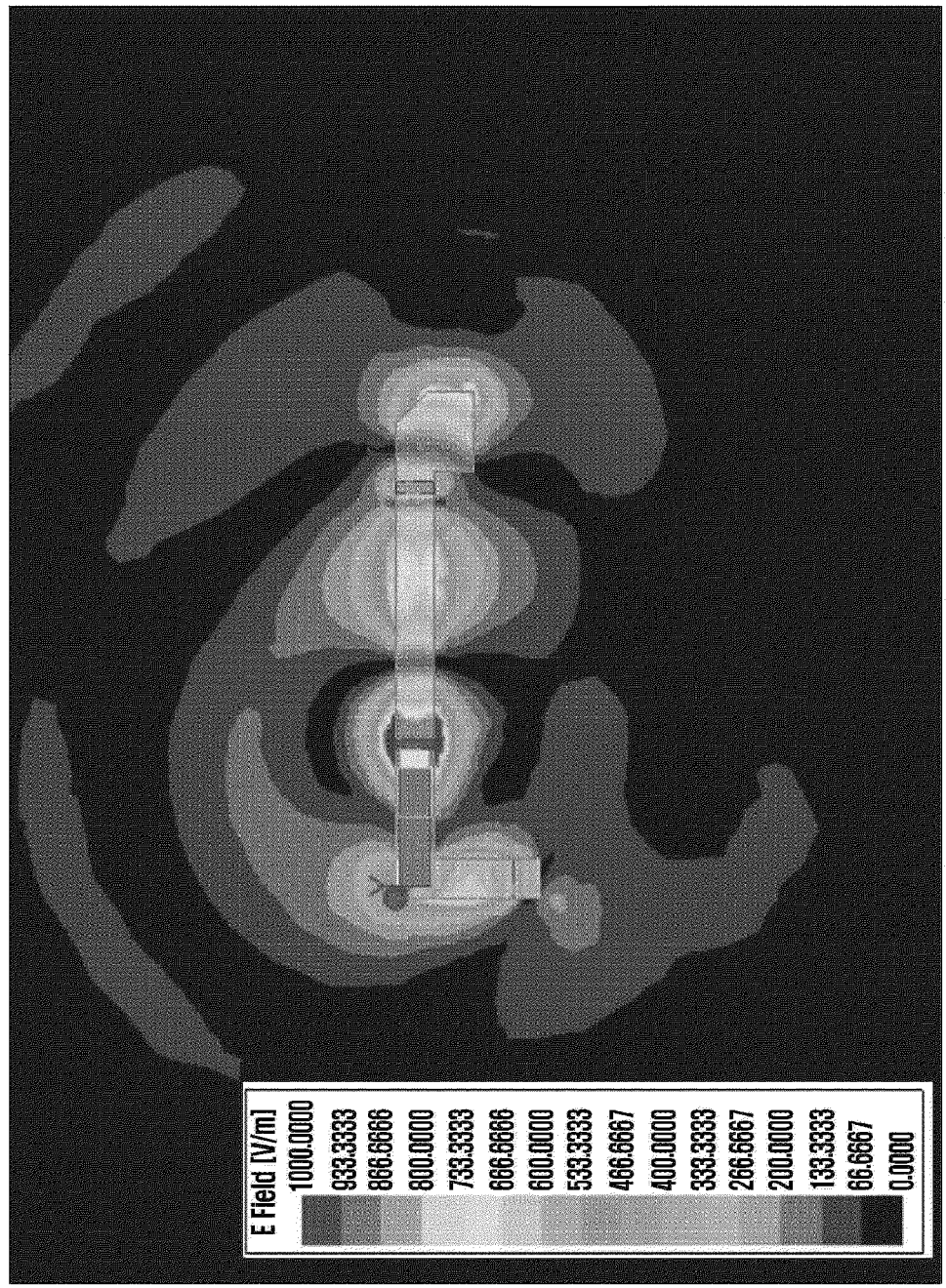
FIG. 6 is a diagram illustrating an electric field of a first conductive portion in the example wearable electronic device shown in FIG. 3 according to various embodiments.
Figure 7:
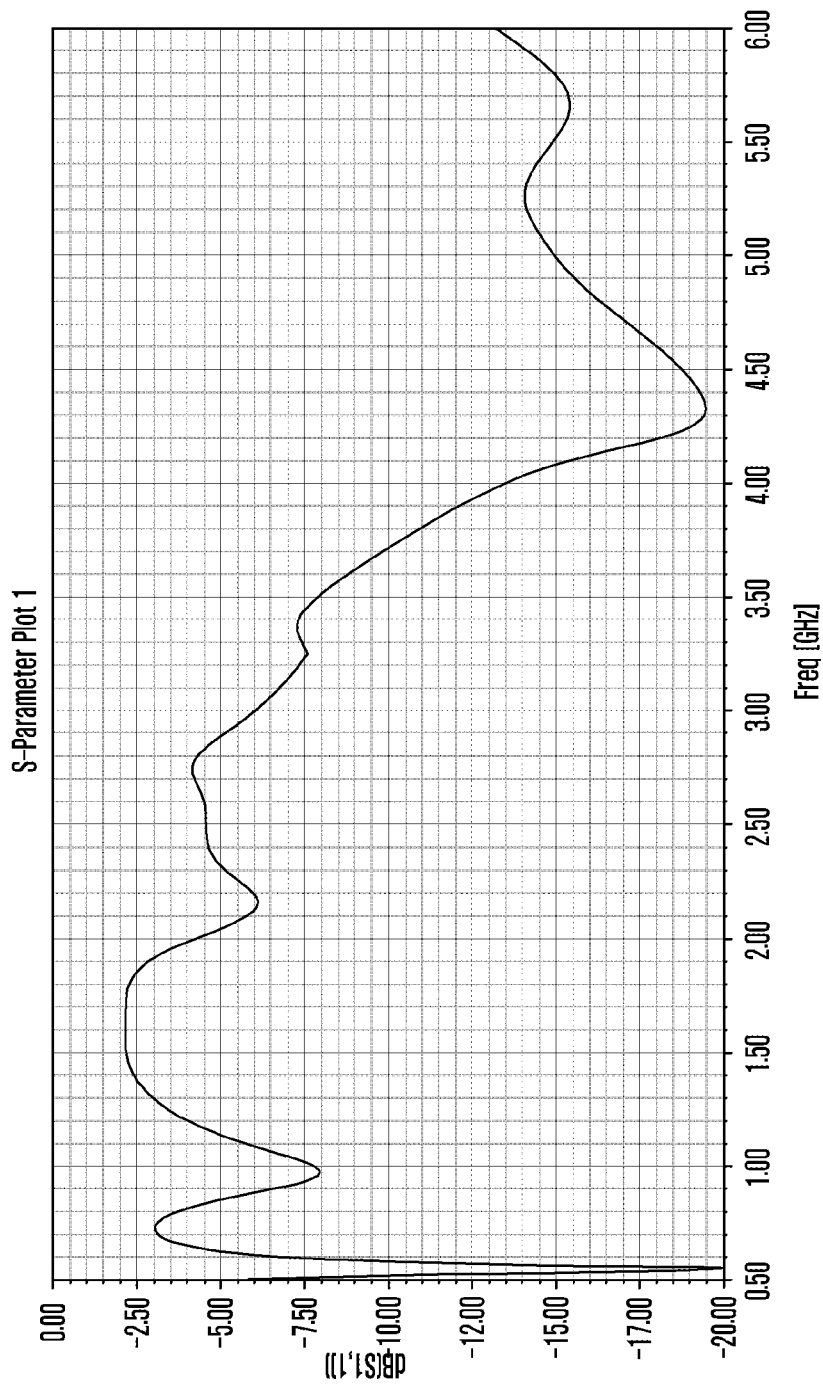
FIG. 7 is a diagram illustrating an S-parameter of the example wearable electronic device shown in FIG. 3 according to various embodiments.

FIG. 6 is a diagram illustrating an electric field of the first conductive portion in the example wearable electronic device shown in FIG. 3 according to various embodiments. FIG. 7 is a diagram illustrating an S-parameter of the example wearable electronic device shown in FIG. 3 according to various embodiments.

With reference to FIG. 6, in the wearable electronic device 200, as described in FIG. 3, the printed circuit board 251 on which the wireless communication circuit 305 is disposed may be included in the first conductive portion 310, the feeding point 311 electrically connected to the wireless communication circuit 305 may be disposed on some of the first conductive portion 310, and the first conductive portion 310 may be electrically connected to the second conductive portion 320 using at least one conductive connection member (e.g., first conductive connection member 315 and/or second conductive connection member 313). In this case, it can be seen in the wearable electronic device 200 that the strength of the electric field is strongly formed between some of the first conductive portion 310 adjacent to the first cut-off portion 301 and some of the second conductive portion 320.

With reference to FIG. 7, on the basis that radiation is possible at about −5 dB or less, it can be seen that the wearable electronic device 200 according to various embodiments can radiate in a frequency band of about 0.5 GHz to 6 GHz using the first conductive portion 310 and the second conductive portion 320. For example, when the wearable electronic device 200 according to various embodiments is configured as shown in FIG. 3, it can be seen that the radiation performance is excellent in the frequency bands of about 0.5 GHz to 0.6 GHz, about 0.8 GHz to 1.2 GHz, about 2.1 GHz to 2.3 GHz, and about 2.9 GHz to 6 GHz.

Figure 8A:
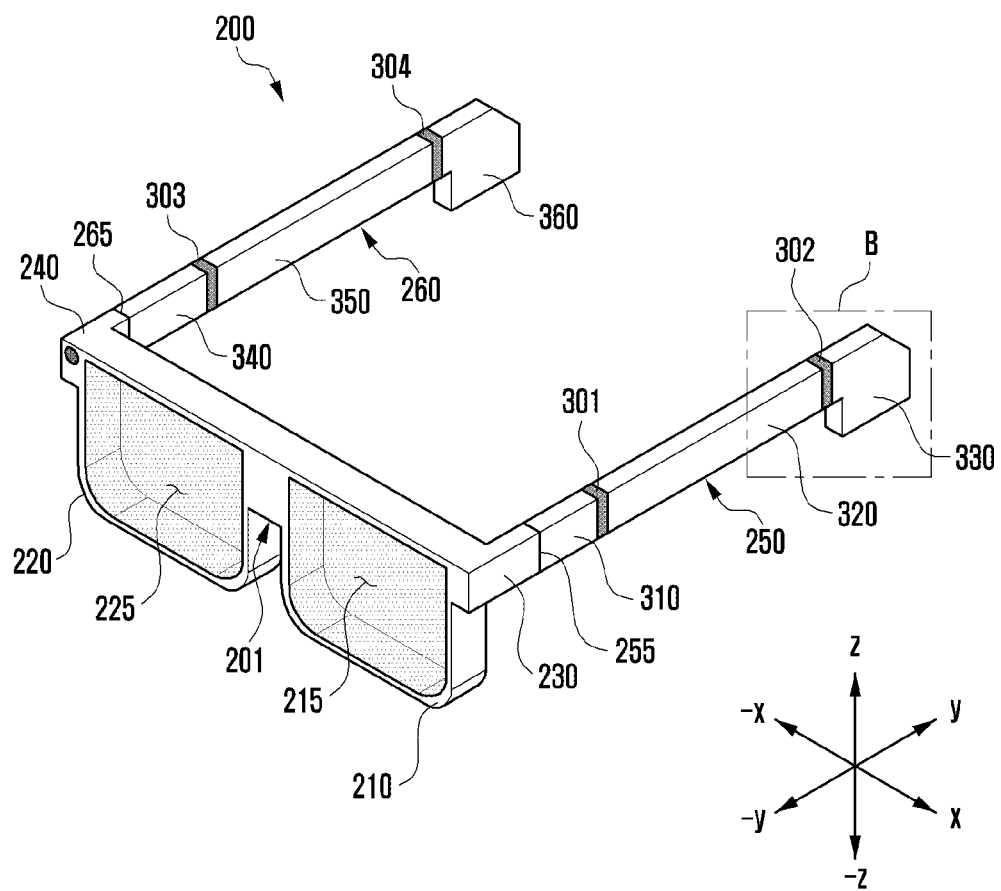
FIG. 8A is a perspective view schematically illustrating an example wearable electronic device including an antenna according to various embodiments.
Figure 8B:
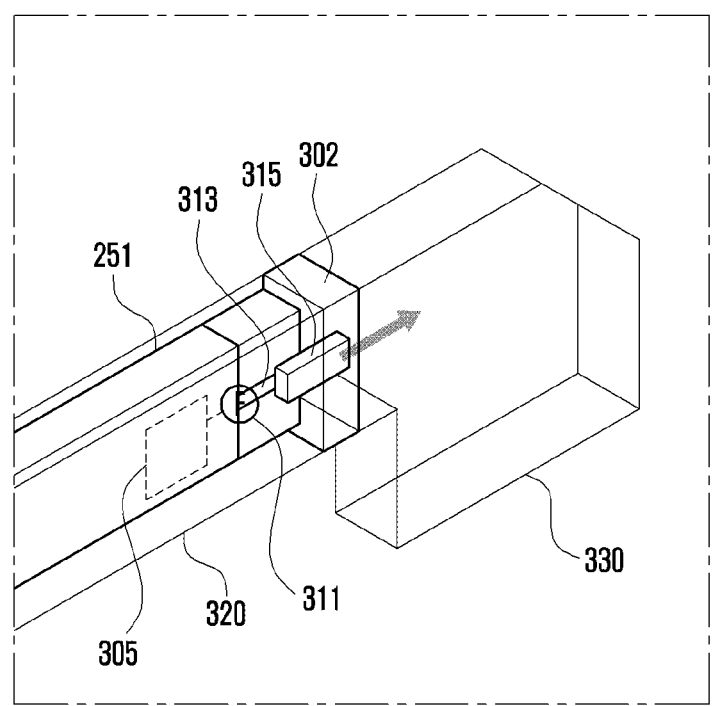
FIG. 8B is an enlarged perspective view of region B of the example wearable electronic device shown in FIG. 8A according to various embodiments.

FIG. 8A is a perspective view schematically illustrating an example wearable electronic device including an antenna according to various embodiments. FIG. 8B is an enlarged perspective view of region B of the example wearable electronic device shown in FIG. 8A according to various embodiments.

The wearable electronic device 200 of FIGS. 8A and 8B may include the components described as to the wearable electronic device 200 of FIG. 3. The wearable electronic device 200 shown in FIG. 8 may be integrated into or applied to the wearable electronic device 200 in FIGS. 3A and 3B.

In the description of the drawings below, components substantially the same as those of the embodiment of the wearable electronic device 200 shown in FIG. 2 or FIGS. 3A and 3B may be given the same reference numerals, and descriptions thereof are not repeated here.

With reference to FIGS. 8A and 8B, in the wearable electronic device 200 according to various embodiments, compared to the embodiment shown in FIG. 3A, the printed circuit board 305 may be disposed inside the second conductive portion 320 adjacent to the second segmenting portion 302.

With reference to FIG. 8B, a printed circuit board 251 (e.g., second printed circuit board) may be disposed inside the second conductive portion 320. The printed circuit board 251 may include a wireless communication circuit 305. A feeding point 311 electrically connected to the wireless communication circuit 305 may be disposed at a site of the second conductive portion 320. A first conductive connection member 315 (e.g., C clip) may be disposed at least partially inside the second cut-off portion 302. The feeding point 311 may be electrically connected to the first conductive connection member 315 and the third conductive portion 330 through a second conductive connection member 313 (e.g., wiring). Radiation from the feeding point 311 may be directed toward the third conductive portion 330 (e.g., y-axis direction).

According to various embodiments, the second conductive portion 320 and the third conductive portion 330 may be electrically connected to the feeding point 311 of the wireless communication circuit 305, and may function as a first antenna radiator (e.g., first antenna) and a second antenna radiator (e.g., second antenna).

Figure 9:
FIG. 9 is a diagram illustrating an electric field of a second conductive portion in the example wearable electronic device shown in FIG. 8 according to various embodiments.
Figure 10:
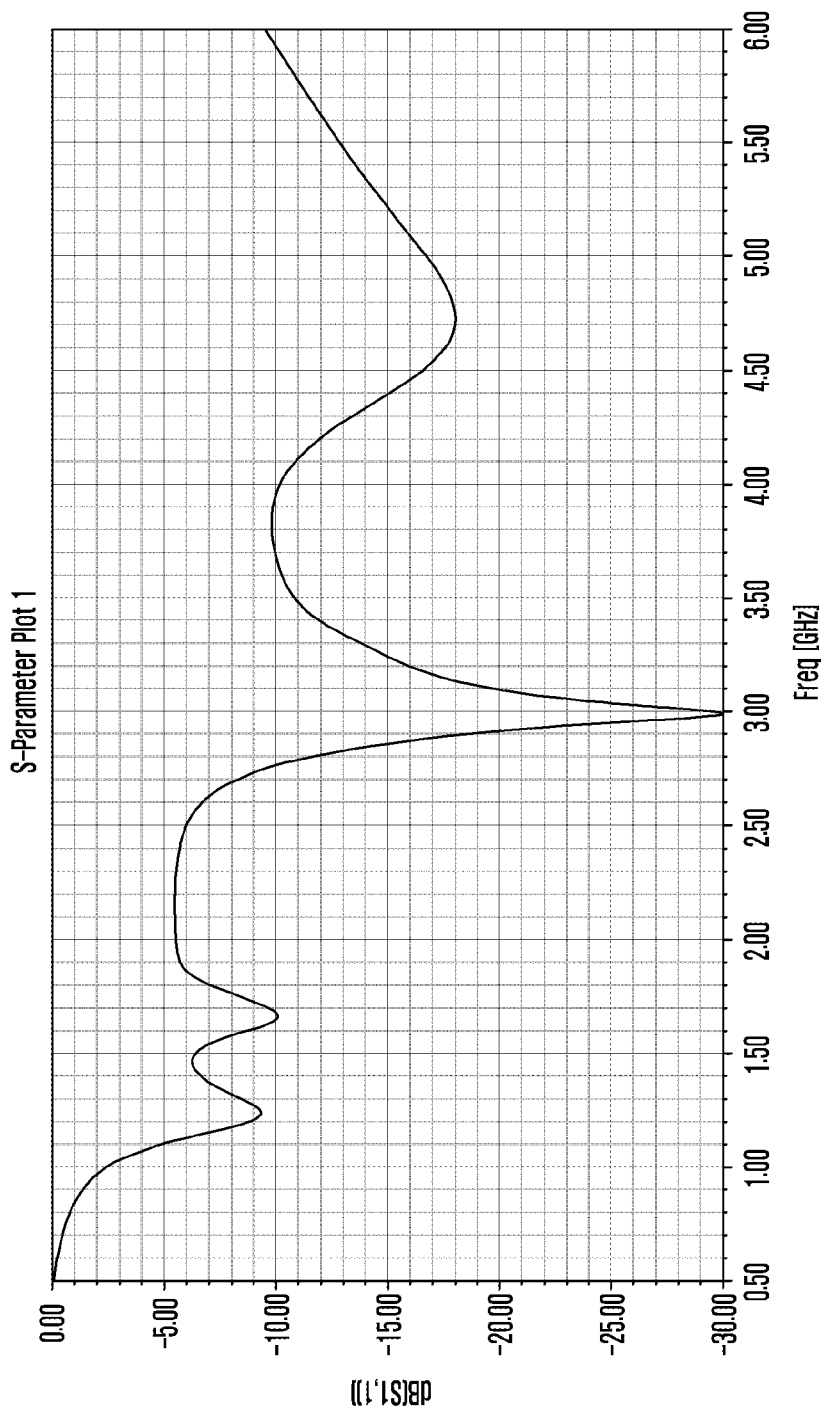
FIG. 10 is a diagram illustrating an S-parameter of the example wearable electronic device shown in FIG. 8 according to various embodiments.

FIG. 9 is a diagram illustrating an electric field of the second conductive portion in the example wearable electronic device shown in FIGS. 8A and 8B according to various embodiments. FIG. 10 is a diagram illustrating an S-parameter of the example wearable electronic device shown in FIGS. 8A and 8B according to various embodiments.

With reference to FIG. 9, in the wearable electronic device 200 according to various embodiments of the disclosure, as described in FIGS. 8A and 8B, the printed circuit board 251 on which the wireless communication circuit 305 is disposed may be included in the second conductive portion 320, the feeding point 311 electrically connected to the wireless communication circuit 305 may be disposed in some of the second conductive portion 320, and the second conductive portion 320 may be electrically connected to the third conductive portion 330 using at least one conductive connection member (e.g., first conductive connection member 315 and/or the second conductive connection member 313). In this case, it can be seen in the wearable electronic device 200 that the strength of the electric field is strongly formed between some of the second conductive portion 320 adjacent to the second segmenting portion 302 and some of the third conductive portion 330.

With reference to FIG. 10, on the basis that radiation is possible at about −5 dB or less, it can be seen that the wearable electronic device 200 according to various embodiments of the disclosure is capable of radiating in a frequency band of about 0.5 GHz to 6 GHz using the second conductive portion 320 and the third conductive portion 330. For example, when the wearable electronic device 200 according to various embodiments of the disclosure is configured as shown in FIGS. 8A and 8B, it can be seen that the radiation performance is excellent in a frequency band of about 1.1 GHz to 6 GHz.

Figure 11A:
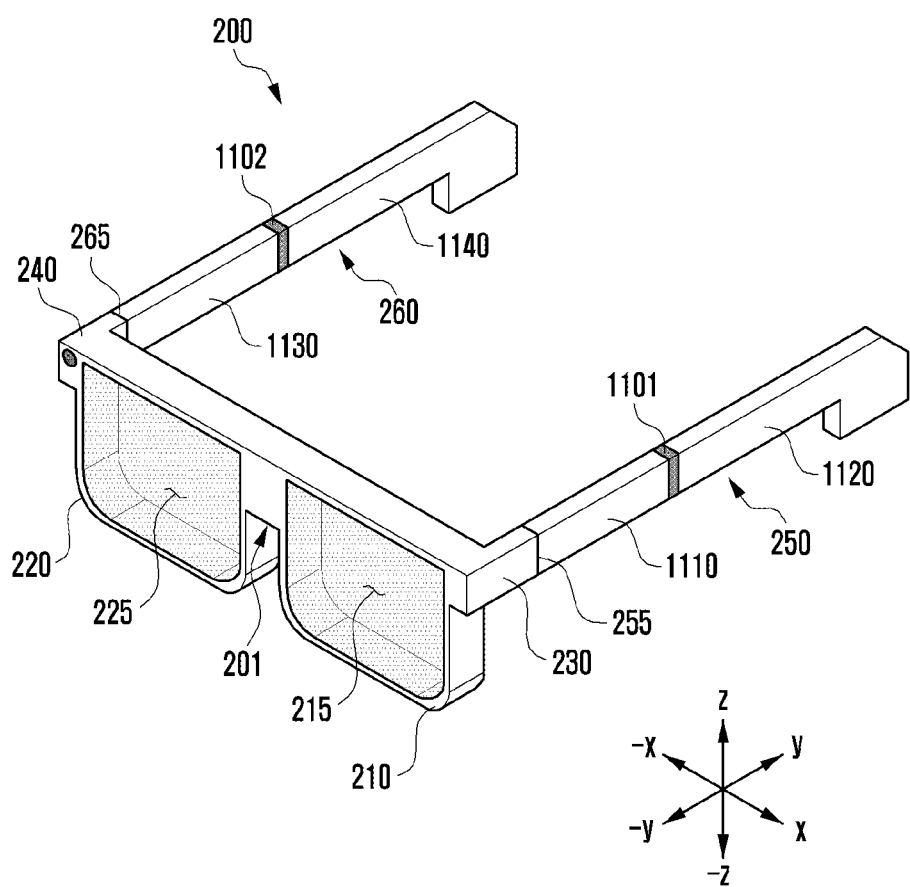
FIG. 11A is a view of an example wearable electronic device whose first temple and second temple are unfolded according to various embodiments.
Figure 11B:
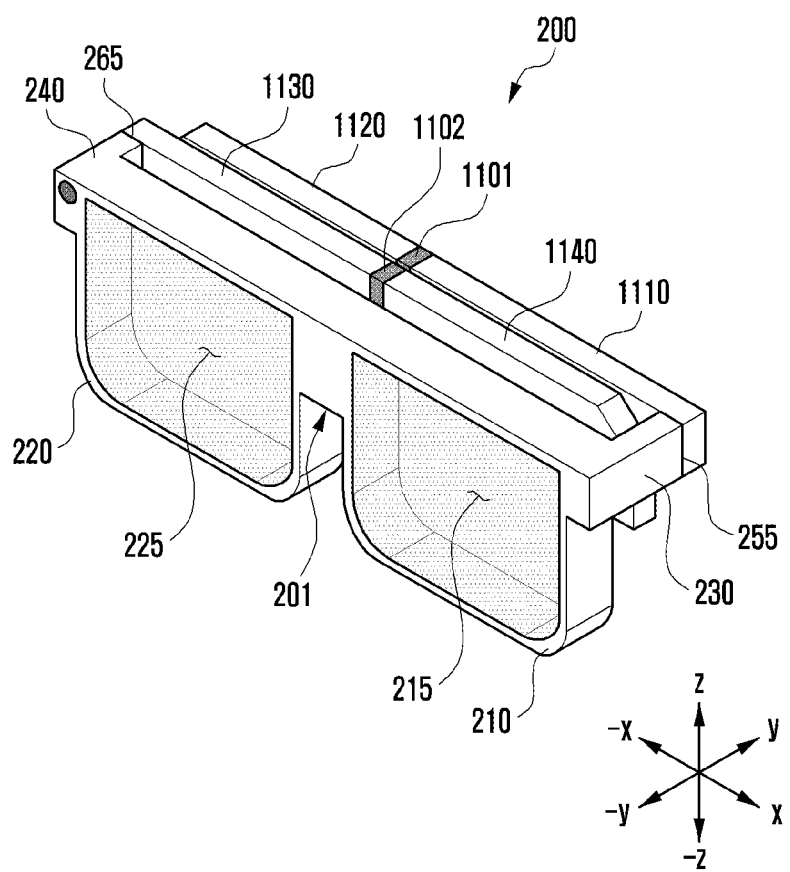
FIG. 11B is a view of the example wearable electronic device shown in FIG. 11A whose first temple and second temple are folded according to various embodiments.

FIG. 11A is a view of an example wearable electronic device whose first temple and second temple are unfolded according to various embodiments. FIG. 11B is a view of the example wearable electronic device shown in FIG. 11A whose first temple and second temple are folded according to various embodiments.

With reference to FIGS. 11A and 11B, in the wearable electronic device 200 according to various embodiments of the disclosure, compared to the embodiments shown in FIG. 3A and FIG. 4, a first segmenting portion 1101 may be formed in the first temple 250, and a second segmenting portion 1102 may be formed in the second temple 260. For example, the first temple 250 may include the first segmenting portion 1101 formed in a substantially middle part, and the second temple 260 may include the second segmenting portion 1102 formed in a substantially middle part.

According to an embodiment, the first temple 250 separated by the first segmenting portion 1101 may include a first conductive portion 1110 and a second conductive portion 1120. The second temple 260 separated by the second segmenting portion 1102 may include a third conductive portion 1130 and a fourth conductive portion 1140.

According to various embodiments, the first conductive portion 1110 may be disposed between the first end piece 230 (or, first hinge 255) and the first segmenting portion 1101. The second conductive portion 1120 may be disposed to face one end (e.g., temple tip) in a direction (e.g., y-axis direction) from the first segmenting portion 1101.

According to various embodiments, the third conductive portion 1130 may be disposed between the second end piece 240 (or, second hinge 265) and the second segmenting portion 1102. The fourth conductive portion 1140 may be disposed to face one end (e.g., temple tip) in a direction (e.g., y-axis direction) from the second segmenting portion 1102.

According to various embodiments, a printed circuit board 251 (e.g., first printed circuit board 251 in FIG. 2) may be disposed inside the first conductive portion 1110, and another printed circuit board (e.g., second printed circuit board 261 in FIG. 2) may be disposed inside the third conductive portion 1130.

With reference to FIG. 11B, the first temple 250 may be folded in a direction where the first rim 210 is disposed (e.g., negative y-axis direction) using the first hinge 255. The second temple 260 may be folded in a direction where the second rim 220 is disposed (e.g., negative y-axis direction) using the second hinge 265.

According to an embodiment, when the second temple 260 is folded first toward the second rim 220, and then the first temple 250 is folded toward the first rim 210, the first segmenting portion 1101 formed in the first temple 250 may be disposed to overlap the second segmenting portion 1102 formed in the second temple 260.

According to various embodiments, the first segmenting portion 1101 of the first temple 250 and the second segmenting portion 1102 of the second temple 260 may be formed at positions facing each other. The first segmenting portion 1101 of the first temple 250 and the second segmenting portion 1102 of the second temple 260 may be symmetrically formed.

Figure 12A:
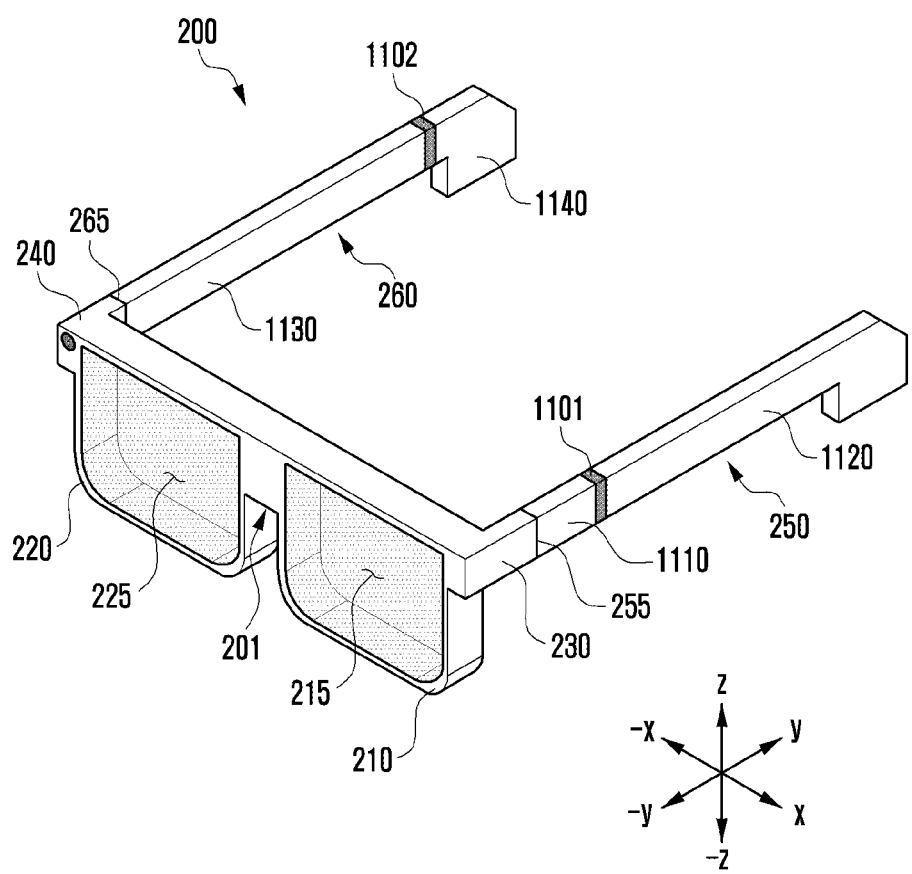
FIG. 12A is a view illustrating an embodiment in which segmenting portions are asymmetrically formed in an example wearable electronic device according to various embodiments.
Figure 12B:
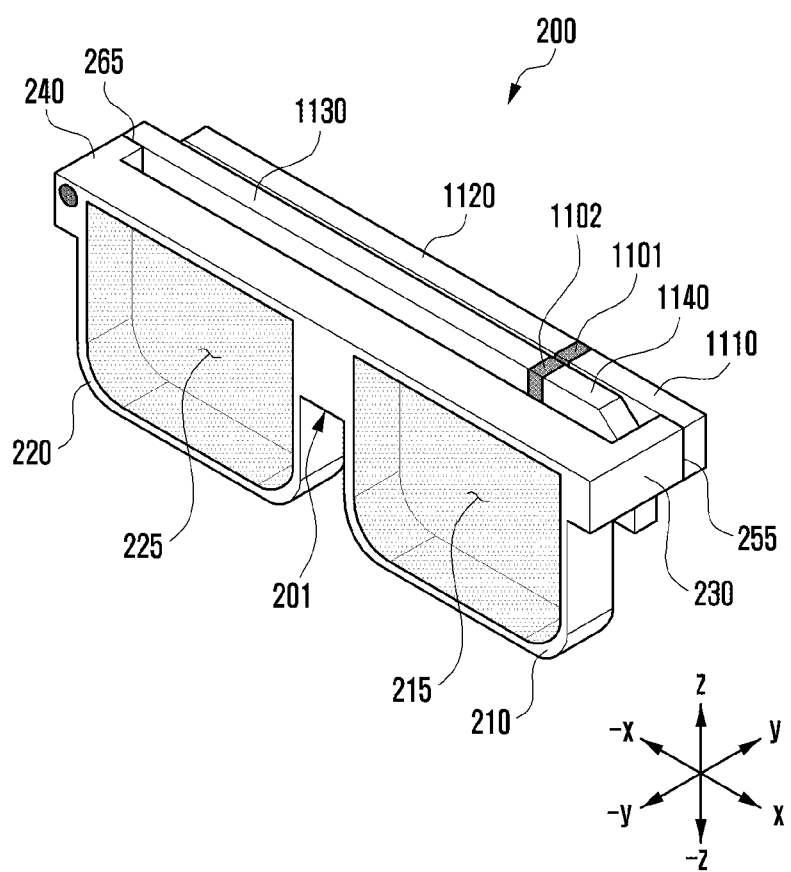
FIG. 12B is a view of the example wearable electronic device shown in FIG. 12A whose first temple and second temple are folded according to various embodiments.

FIG. 12A is a view illustrating segmenting portions asymmetrically formed in an example wearable electronic device according to various embodiments. FIG. 12B is a view of the example wearable electronic device shown in FIG. 12A whose first temple and second temple are folded according to various embodiments.

With reference to FIGS. 12A and 12B, in the wearable electronic device 200 according to various embodiments, compared to the embodiment shown in FIGS. 11A and 11B, the first segmenting portion 1101 formed in the first temple 250 and the second segmenting portion 1102 formed in the second temple 260 may be asymmetrically disposed. For example, the first segmenting portion 1101 formed in the first temple 250 may be disposed in a direction adjacent to the first hinge 255 (e.g., negative y-axis direction). The second segmenting portion 1102 formed in the second temple 260 may be disposed in a direction adjacent to the temple tip of the second temple 260 (e.g., y-axis direction).

According to an embodiment, the first temple 250 separated by the first segmenting portion 1101 may include a first conductive portion 1110 and a second conductive portion 1120. The second temple 260 separated by the second segmenting portion 1102 may include a third conductive portion 1130 and a fourth conductive portion 1140.

According to various embodiments, the first conductive portion 1110 may be disposed between the first end piece 230 (or, first hinge 255) and the first segmenting portion 1101. The second conductive portion 1120 may be disposed to face one end (e.g., temple tip) in a direction (e.g., y-axis direction) from first segmenting portion 1101.

According to various embodiments, the third conductive portion 1130 may be disposed between the second end piece 240 (or, second hinge 265) and the second segmenting portion 1102. The fourth conductive portion 1140 may be disposed to face one end (e.g., temple tip) in a direction (e.g., y-axis direction) from the second segmenting portion 1102.

According to various embodiments, a printed circuit board 251 (e.g., first printed circuit board 251 in FIG. 2) may be disposed inside the first conductive portion 1110, and another printed circuit board (e.g., second printed circuit board 261 in FIG. 2) may be disposed inside the third conductive portion 1130.

With reference to FIG. 12B, the first temple 250 may be folded in a direction (e.g., negative y-axis direction) in which the first rim 210 is disposed using the first hinge 255. The second temple 260 may be folded in a direction (e.g., negative y-axis direction) in which the second rim 220 is disposed using the second hinge 265.

According to an embodiment, when the second temple 260 is folded first toward the second rim 220, and then the first temple 250 is folded toward the first rim 210, the first segmenting portion 1101 formed in the first temple 250 may be disposed to overlap the second segmenting portion 1102 formed in the second temple 260.

According to various embodiments, the first segmenting portion 1101 of the first temple 250 and the second segmenting portion 1102 of the second temple 260 may be formed at positions not facing each other. The first segmenting portion 1101 of the first temple 250 and the second segmenting portion 1102 of the second temple 260 may be asymmetrically formed.

Figure 13A:
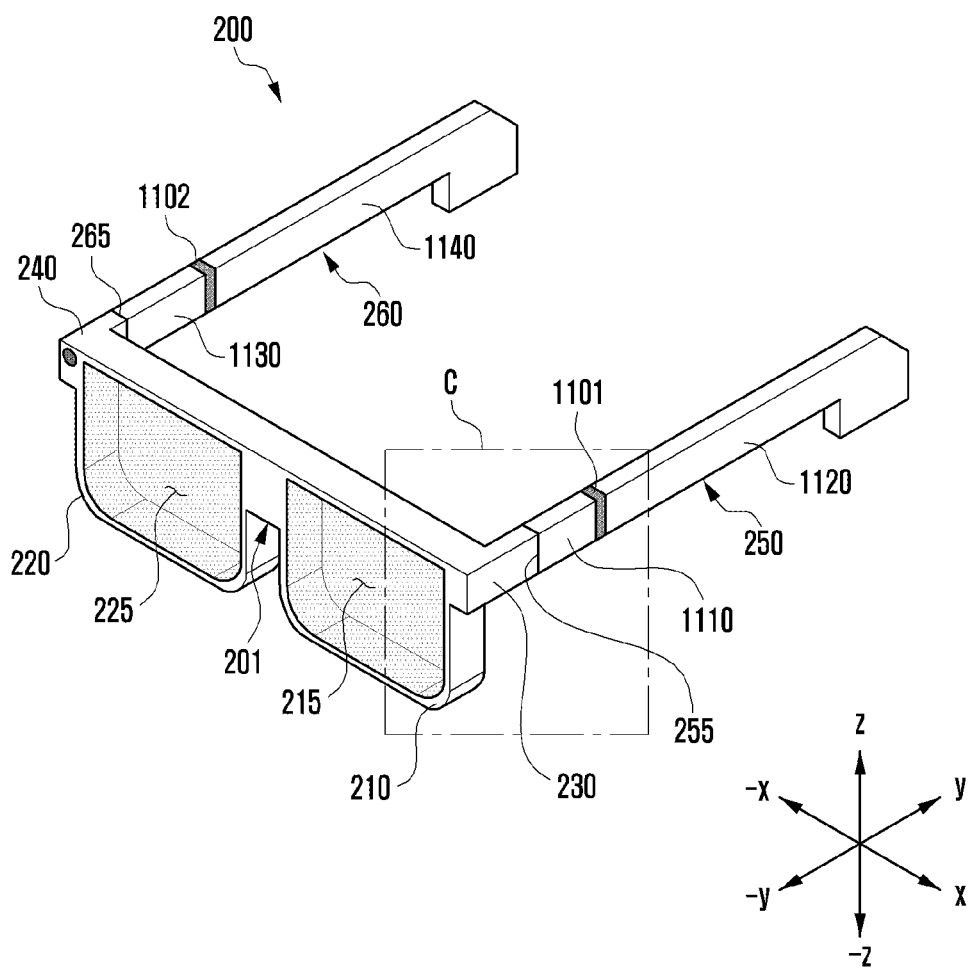
FIG. 13A is a view illustrating an embodiment in which segmenting portions are symmetrically formed in an example wearable electronic device including an antenna according to various embodiments.
Figure 13B:
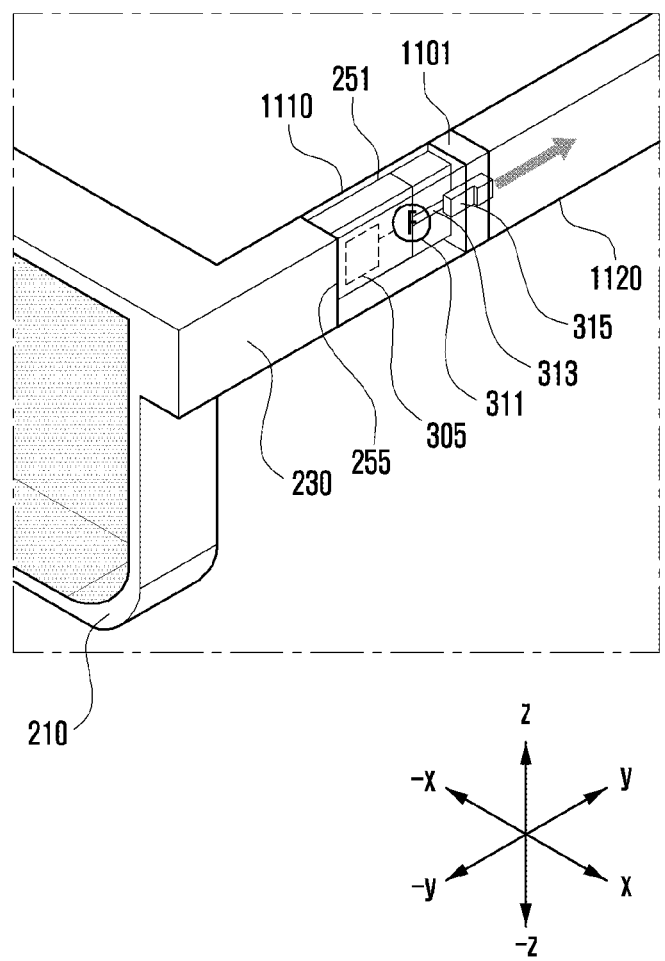
FIG. 13B is an enlarged perspective view of region C of the wearable electronic device shown in FIG. 13A according to various embodiments.

FIG. 13A is a view illustrating segmenting portions symmetrically formed in an example wearable electronic device including an antenna according to various embodiments. FIG. 13B is an enlarged perspective view of region C of the example wearable electronic device shown in FIG. 13A according to various embodiments.

With reference to FIGS. 13A and 13B, in the wearable electronic device 200 according to various embodiments, compared to the embodiment shown in FIG. 12A, the first segmenting portion 1101 formed in the first temple 250 and the second segmenting portion 1102 formed in the second temple 260 may be disposed at symmetrical positions. For example, the first segmenting portion 1101 formed in the first temple 250 may be disposed in a direction adjacent to the first hinge 255 (e.g., negative y-axis direction). The second segmenting portion 1102 formed in the second temple 260 may be disposed in a direction adjacent to the second hinge 265 (e.g., negative y-axis direction).

According to an embodiment, the first temple 250 may be folded in a direction where the first rim 210 is disposed (e.g., negative y-axis direction) using the first hinge 255. The second temple 260 may be folded in a direction where the second rim 220 is disposed (e.g., negative y-axis direction) using the second hinge 265. For example, when the second temple 260 is folded first toward the second rim 220, and then the first temple 250 is folded toward the first rim 210, the first segmenting portion 1101 formed in the first temple 250 may not overlap the second segmenting portion 1102 formed in the second temple 260.

According to an embodiment, the first temple 250 separated by the first segmenting portion 1101 may include a first conductive portion 1110 and a second conductive portion 1120. The second temple 260 separated by the second segmenting portion 1102 may include a third conductive portion 1130 and a fourth conductive portion 1140.

According to various embodiments, the first conductive portion 1110 may be disposed between the first end piece 230 (or, first hinge 255) and the first segmenting portion 1101. The second conductive portion 1120 may be disposed to face one end (e.g., temple tip) in a direction (e.g., y-axis direction) from the first segmenting portion 1101.

According to various embodiments, the third conductive portion 1130 may be disposed between the second end piece 240 (or, second hinge 265) and the second segmenting portion 1102. The fourth conductive portion 1140 may be disposed to face one end (e.g., temple tip) in a direction (e.g., y-axis direction) from the second segmenting portion 1102.

With reference to FIG. 13B, a printed circuit board 251 may be disposed inside the first conductive portion 1110. The printed circuit board 251 may include a wireless communication circuit 305. A feeding point 311 electrically connected to the wireless communication circuit 305 may be disposed in some of the first conductive portion 1110. A first conductive connection member 315 (e.g., C clip) may be disposed at least partially inside the first segmenting portion 1101. The feeding point 311 may be electrically connected to the first conductive connection member 315 and the second conductive portion 1120 through a second conductive connection member 313 (e.g., wiring). Radiation from the feeding point 311 may be directed toward the second conductive portion 1120 (e.g., y-axis direction).

According to various embodiments, the first conductive portion 1110 and the second conductive portion 1120 may be electrically connected to the feeding point 311 of the wireless communication circuit 305, and may function as a first antenna radiator (e.g., first antenna) and a second antenna radiator (e.g., second antenna).

Figure 14:
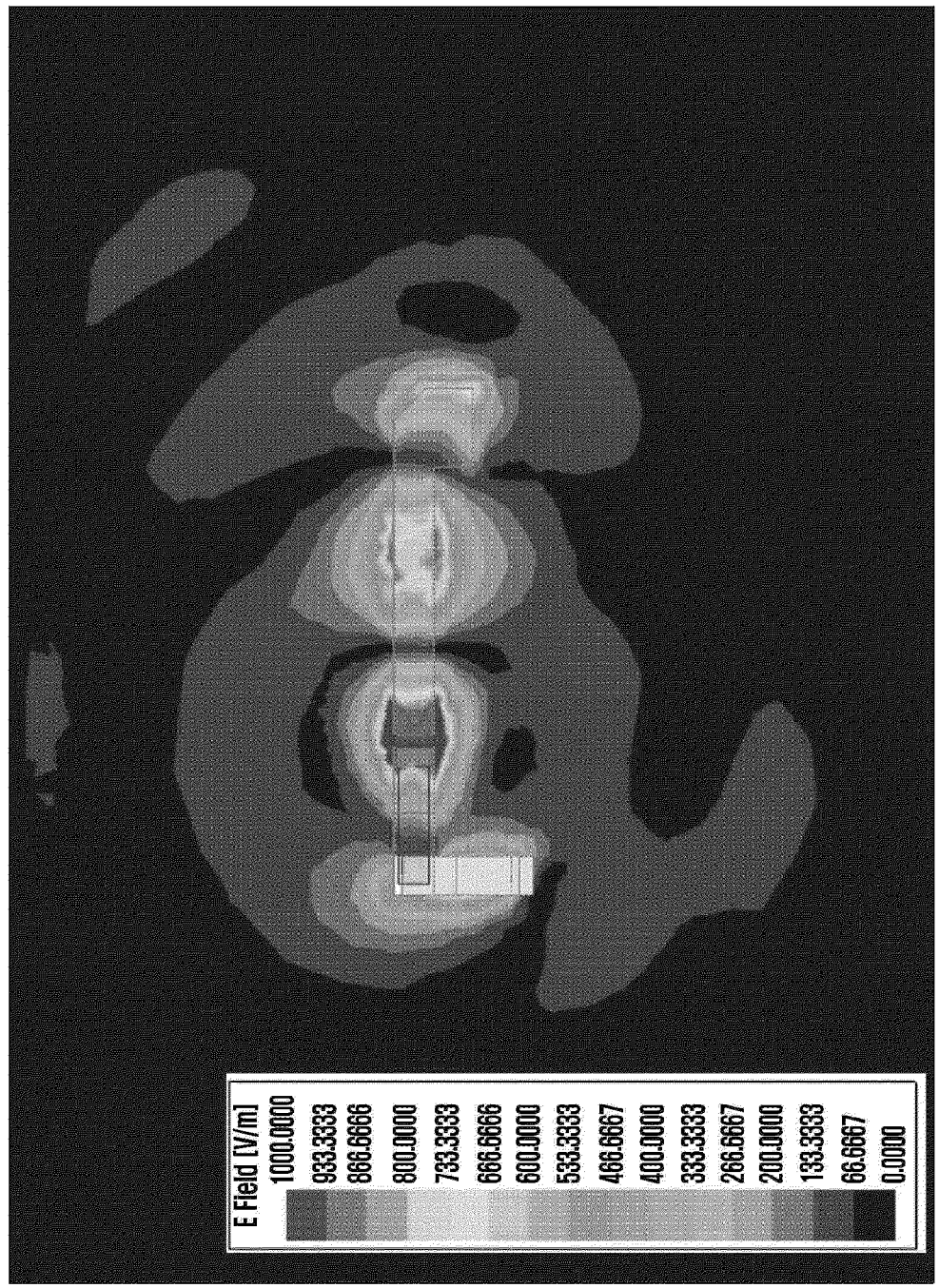
FIG. 14 is a diagram illustrating an electric field of a first conductive portion in the example wearable electronic device shown in FIG. 13A according to various embodiments.
Figure 15:
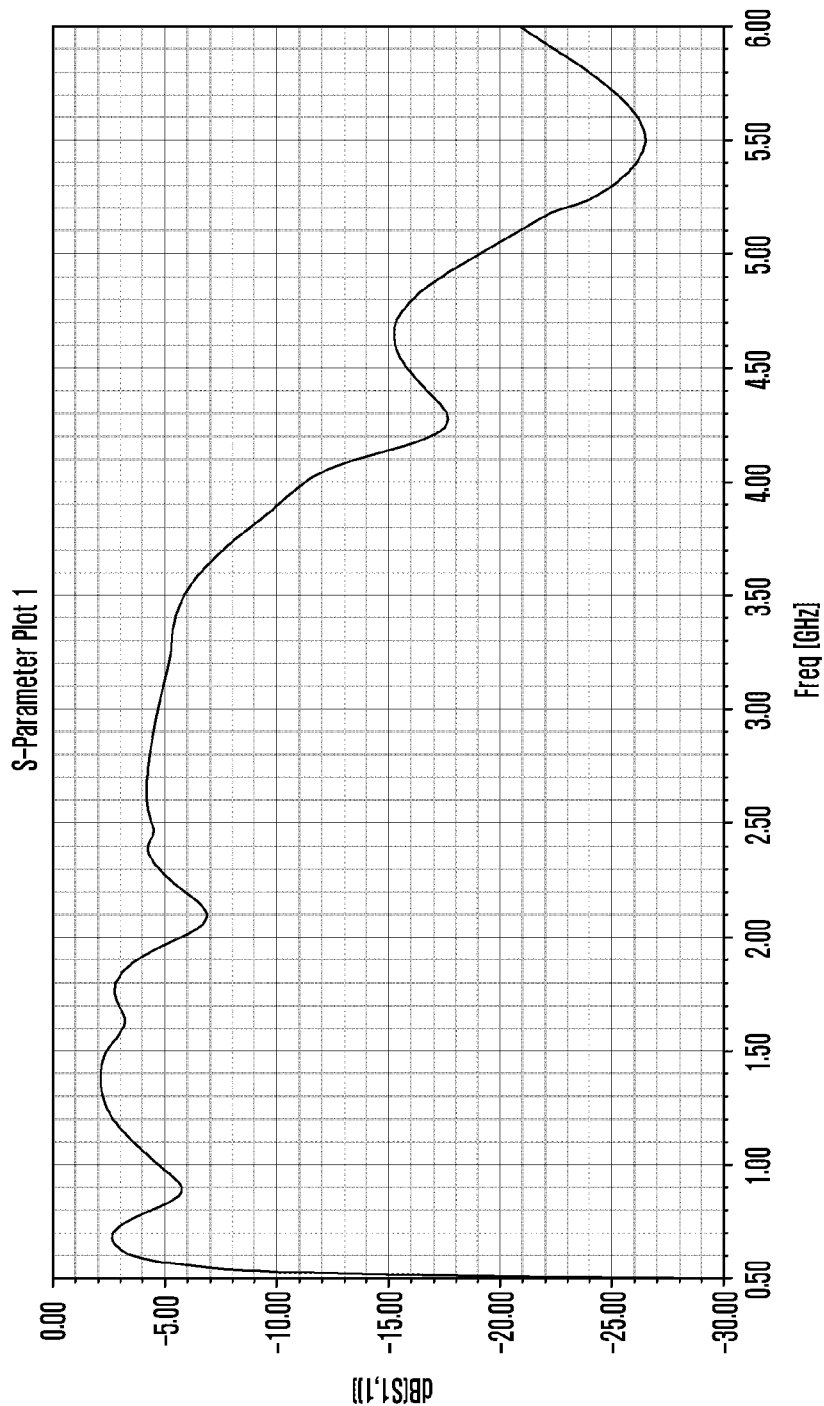
FIG. 15 is a diagram illustrating an S-parameter of the example wearable electronic device shown in FIG. 13A according to various embodiments.

FIG. 14 is a diagram illustrating an electric field of the first conductive portion in the example wearable electronic device shown in FIG. 13A according to various embodiments. FIG. 15 is a diagram illustrating an S-parameter of the wearable electronic device shown in FIG. 13A according to various embodiments.

With reference to FIG. 14, in the wearable electronic device 200 according to various embodiments of the disclosure, as described in FIG. 13B, the printed circuit board 251 on which the wireless communication circuit 305 is disposed may be included in the first conductive portion 1110, the feeding point 311 electrically connected to the wireless communication circuit 305 may be disposed on some of the first conductive portion 1110, and the first conductive portion 1110 may be electrically connected to the second conductive portion 1120 using at least one conductive connection member (e.g., first conductive connection member 315 and/or second conductive connection member 313). In this case, it can be seen in the wearable electronic device 200 that the strength of the electric field is strongly formed between some of the first conductive portion 1110 adjacent to the first cut-off portion 1101 and some of the second conductive portion 1120.

With reference to FIG. 15, on the basis that radiation is possible at about −5 dB or less, it can be seen that the wearable electronic device 200 according to various embodiments of the disclosure can radiate in a frequency band of about 0.5 GHz to 6 GHz using the first conductive portion 1110 and the second conductive portion 1120. For example, when the wearable electronic device 200 according to various embodiments of the disclosure is configured as shown in FIG. 13A, it can be seen that the radiation performance is excellent in the frequency bands of about 0.5 GHz to 0.6 GHz, about 2.3 GHz to 2.9 GHz, and about 3.1 GHz to 6 GHz.

Figure 16A:
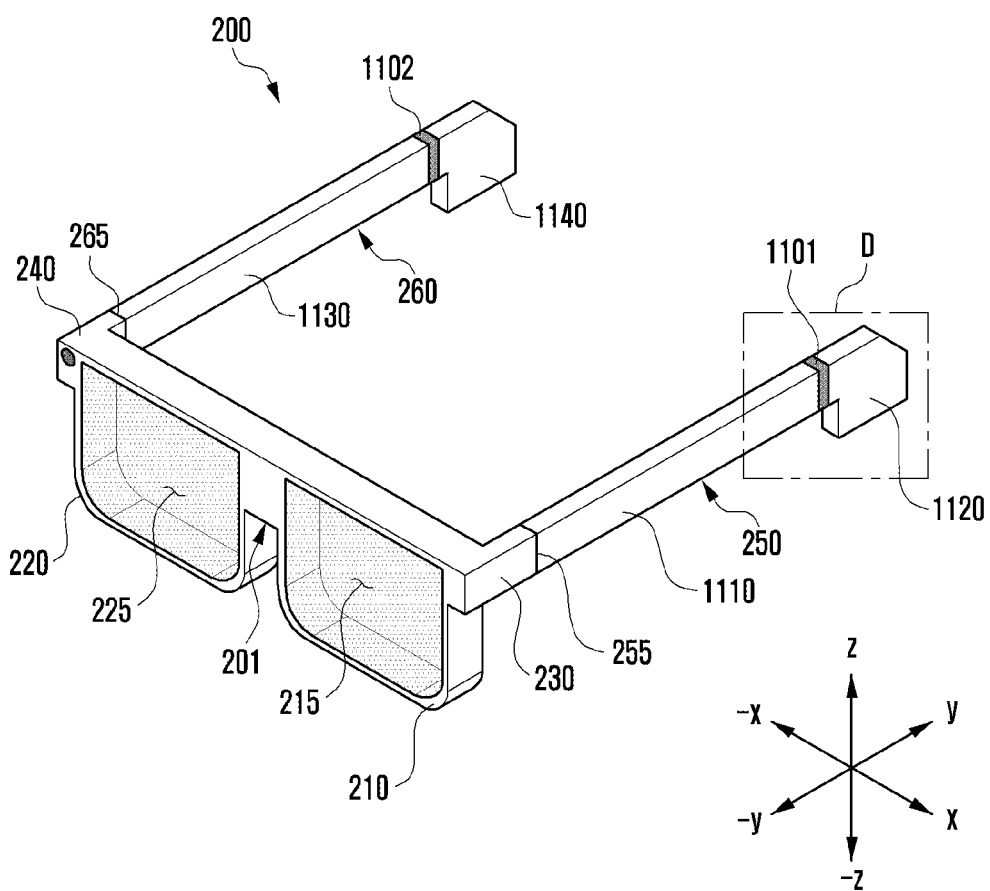
FIG. 16A is a view illustrating various embodiments in which segmenting portions are symmetrically formed in an example wearable electronic device including an antenna according to various embodiments.
Figure 16B:
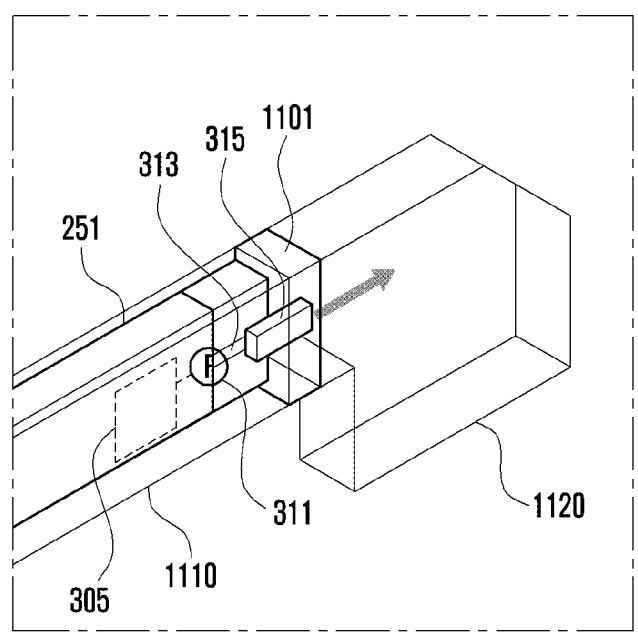
FIG. 16B is an enlarged perspective view of region D of the example wearable electronic device shown in FIG. 16A according to various embodiments.
Figure 16B:
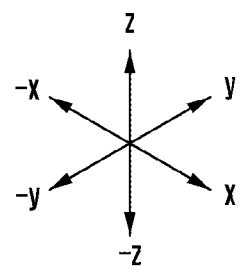

FIG. 16A is a view illustrating segmenting portions symmetrically formed in an example wearable electronic device including an antenna according to various embodiments. FIG. 16B is an enlarged perspective view of region D of the example wearable electronic device shown in FIG. 16A according to various embodiments.

With reference to FIGS. 16A and 16B, in the wearable electronic device 200 according to various embodiments, compared to the embodiment shown in FIG. 12A, the first segmenting portion 1101 formed in the first temple 250 and the second segmenting portion 1102 formed in the second temple 260 may be disposed at symmetrical positions. For example, the first segmenting portion 1101 formed in the first temple 250 may be disposed in a direction adjacent to one end (temple tip) of the first temple 250 (e.g., y-axis direction). The second segmenting portion 1102 formed in the second temple 260 may be disposed in a direction adjacent to one end (temple tip) of the second temple 260 (e.g., y-axis direction).

According to an embodiment, the first temple 250 may be folded in a direction where the first rim 210 is disposed (e.g., negative y-axis direction) using the first hinge 255. The second temple 260 may be folded in a direction where the second rim 220 is disposed (e.g., negative y-axis direction) using the second hinge 265. For example, when the second temple 260 is folded first toward the second rim 220, and then the first temple 250 is folded toward the first rim 210, the first segmenting portion 1101 formed in the first temple 250 may not overlap the second segmenting portion 1102 formed in the second temple 260.

According to an embodiment, the first temple 250 separated by the first segmenting portion 1101 may include a first conductive portion 1110 and a second conductive portion 1120. The second temple 260 separated by the second segmenting portion 1102 may include a third conductive portion 1130 and a fourth conductive portion 1140.

According to various embodiments, the first conductive portion 1110 may be disposed between the first end piece 230 (or, first hinge 255) and the first segmenting portion 1101. The second conductive portion 1120 may be disposed to face one end (e.g., temple tip) in a direction (e.g., y-axis direction) from the first segmenting portion 1101.

According to various embodiments, the third conductive portion 1130 may be disposed between the second end piece 240 (or, second hinge 265) and the second segmenting portion 1102. The fourth conductive portion 1140 may be disposed to face one end (e.g., temple tip) in a direction (e.g., y-axis direction) from the second segmenting portion 1102.

With reference to FIG. 16B, a printed circuit board 251 may be disposed inside the first conductive portion 1110. The printed circuit board 251 may include a wireless communication circuit 305. A feeding point 311 electrically connected to the wireless communication circuit 305 may be disposed in some of the first conductive portion 1110. A first conductive connection member 315 (e.g., C clip) may be disposed at least partially inside the second segmenting portion 1102. The feeding point 311 may be electrically connected to the first conductive connection member 315 and the second conductive portion 1120 through a second conductive connection member 313 (e.g., wiring). Radiation from the feeding point 311 may be directed toward the second conductive portion 1120 (e.g., y-axis direction).

According to various embodiments, the first conductive portion 1110 and the second conductive portion 1120 may be electrically connected to the feeding point 311 of the wireless communication circuit 305, and may function as a first antenna radiator (e.g., first antenna) and a second antenna radiator (e.g., second antenna).

Figure 17:
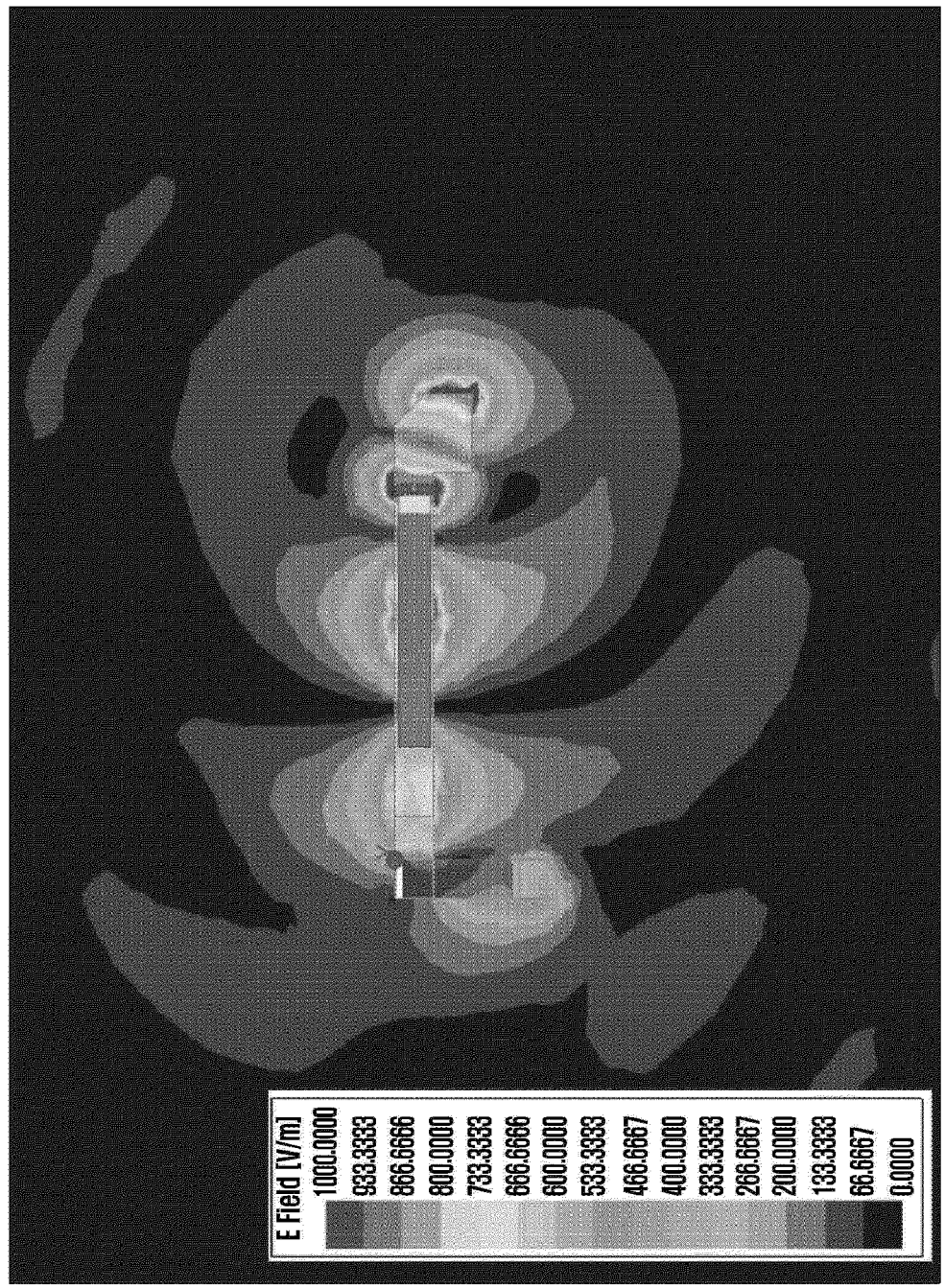
FIG. 17 is a diagram illustrating an electric field around a first cut-off portion in the example wearable electronic device shown in FIG. 16A according to various embodiments.
Figure 18:
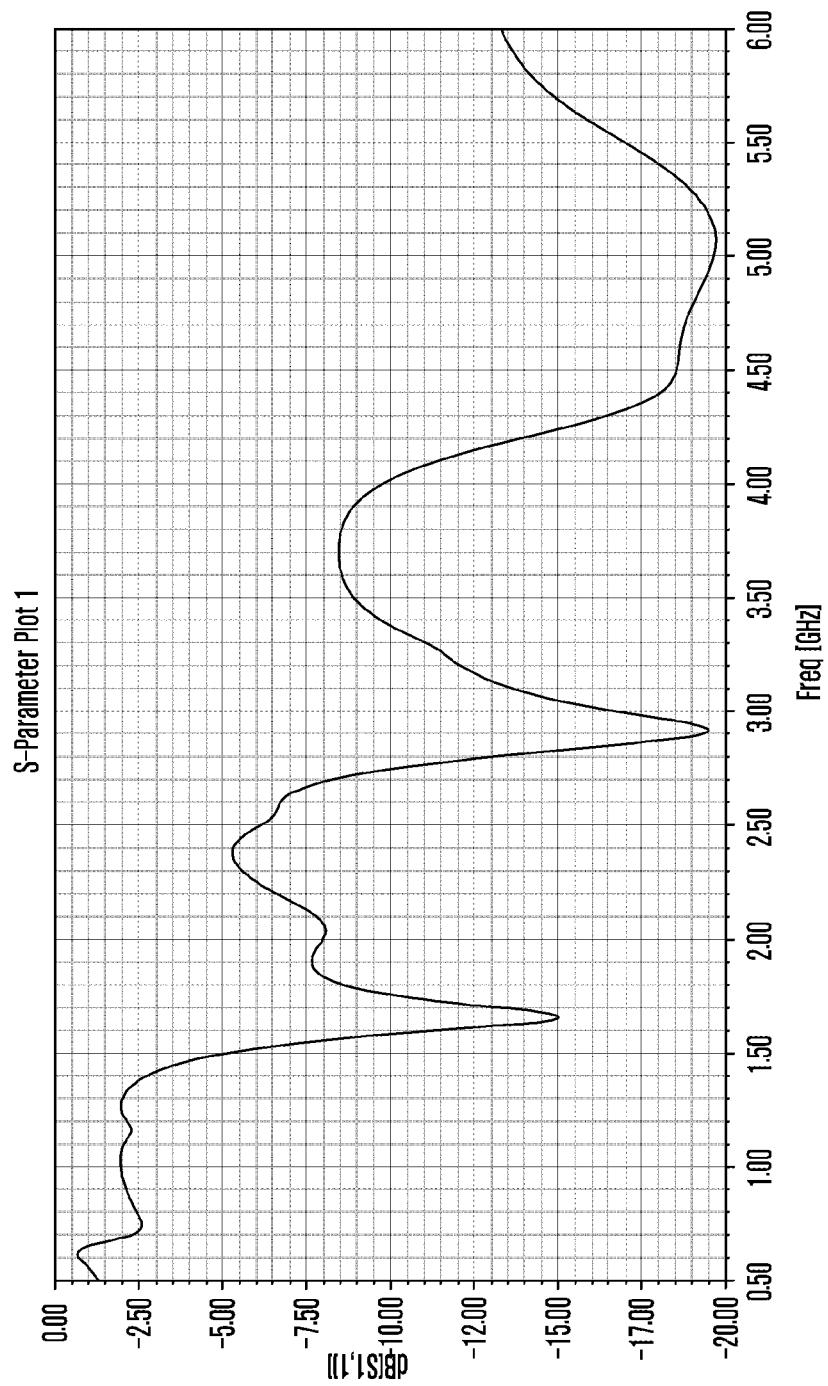
FIG. 18 is a diagram illustrating an S-parameter of the example wearable electronic device shown in FIG. 16A according to various embodiments.

FIG. 17 is a diagram illustrating an electric field around the first segmenting portion in the example wearable electronic device shown in FIG. 16A according to various embodiments. FIG. 18 is a diagram illustrating an S-parameter of the example wearable electronic device shown in FIG. 16A according to various embodiments.

With reference to FIG. 17, in the wearable electronic device 200 according to various embodiments of the disclosure, as described in FIG. 16B, the printed circuit board 251 on which the wireless communication circuit 305 is disposed may be included in the first conductive portion 1110, the feeding point 311 electrically connected to the wireless communication circuit 305 may be disposed on some of the first conductive portion 1110, and the first conductive portion 1110 may be electrically connected to the second conductive portion 1120 using at least one conductive connection member (e.g., first conductive connection member 315 and/or second conductive connection member 313). In this case, it can be seen in the wearable electronic device 200 that the strength of the electric field is strongly formed in at least some of the first conductive portion 1110 adjacent to the first cut-off portion 1101 and in at least some of the second conductive portion 1120.

With reference to FIG. 18, on the basis that radiation is possible at about −5 dB or less, it can be seen that the wearable electronic device 200 according to various embodiments of the disclosure can radiate in a frequency band of about 1.5 GHz to 6 GHz using the first conductive portion 1110 and the second conductive portion 1120. For example, when the wearable electronic device 200 according to various embodiments of the disclosure is configured as shown in FIG. 16A, it can be seen that the radiation performance is excellent in the frequency band of about 1.5 GHz to 6 GHz.

Figure 19A:
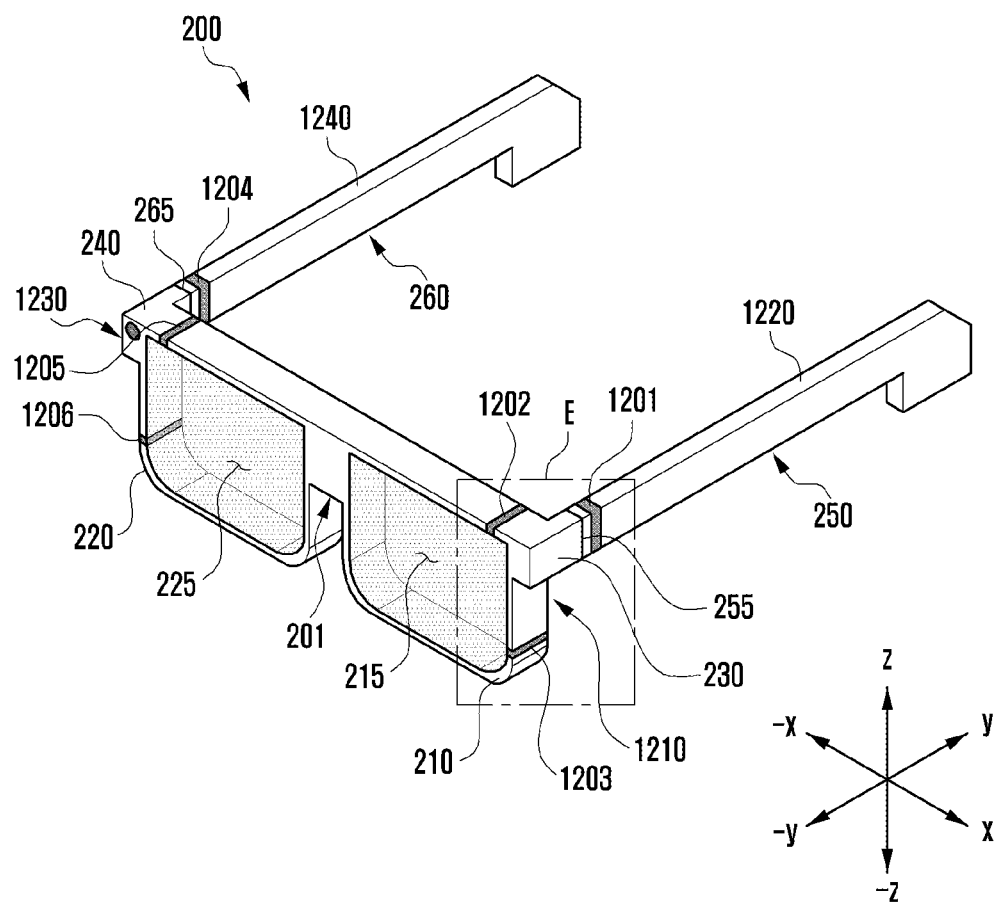
FIG. 19A is a perspective view schematically illustrating an example wearable electronic device including an antenna according to various embodiments.
Figure 19B:
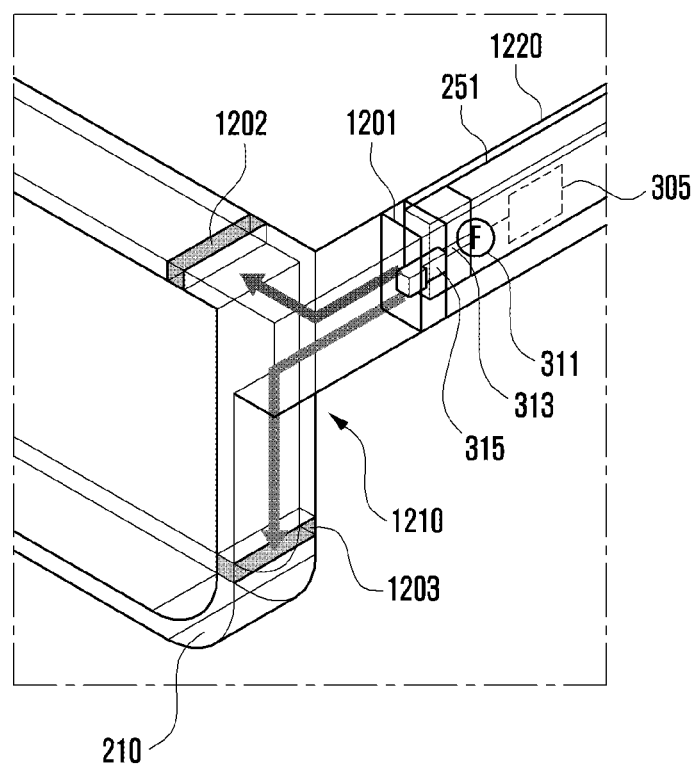
FIG. 19B is an enlarged perspective view of region E of the example wearable electronic device shown in FIG. 19A according to various embodiments.

FIG. 19A is a perspective view schematically illustrating an example wearable electronic device including an antenna according to various embodiments. FIG. 19B is an enlarged perspective view of region E of the wearable electronic device shown in FIG. 19A according to various embodiments.

With reference to FIG. 19A, the wearable electronic device 200 according to various embodiments of the disclosure may include a bridge 201, a first rim 210, a second rim 220, a first end piece 230, a second end piece 240, a first temple 250, and/or a second temple 260.

According to an embodiment, the bridge 201 may connect the first rim 210 and the second rim 220. The bridge 201 may be made of a non-conductive material (e.g., polymer). At least some of the bridge 201 may be made of a conductive material (e.g., metal).

According to an embodiment, the first rim 210 and the second rim 220 may constitute the frame (e.g., glasses frame) of the wearable electronic device 200. At least some of the first rim 210 and the second rim 220 may be made of a conductive material (e.g., metal).

According to various embodiments, the first rim 210 may be disposed in a first direction (e.g., x-axis direction) of the bridge 201. The first rim 210 may be disposed around the user's left eye. The second rim 220 may be disposed in a second direction (e.g., negative x-axis direction) of the bridge 201 opposite to the first direction (e.g., x-axis direction). The second rim 220 may be disposed around the user's right eye.

According to an embodiment, the first end piece 230 may be coupled to a portion (e.g., x-axis direction) of the first rim 210. The second end piece 240 may be coupled to a portion (e.g., negative x-axis direction) of the second rim 220. The first end piece 230 may connect the first rim 210 and the first temple 250. The second end piece 240 may connect the second rim 220 and the second temple 260. At least some of the first end piece 230 and the second end piece 240 may be made of a conductive material (e.g., metal).

According to an embodiment, the first temple 250 may be operably connected to the first end piece 230 using a first hinge 255. The first hinge 255 may be rotatably configured so that the first temple 250 is folded or unfolded with respect to the first rim 210. The first temple 250 may extend along the left side of the user's head, for example. The second temple 260 may be operably connected to the second end piece 240 using a second hinge 265. The second hinge 265 may be rotatably configured so that the second temple 260 is folded or unfolded with respect to the second rim 220. The second temple 260 may extend along the right side of the user's head, for example. The first temple 250 and/or the second temple 260 may be at least partially made of a conductive material (e.g., metal).

According to an embodiment, the first temple 250 may include a first segmenting portion 1201. The first segmenting portion 1201 may be formed adjacent to the first hinge 255. A second segmenting portion 1202 may be formed in a first direction (e.g., negative x-axis direction) of the first rim 210. A third segmenting portion 1203 may be formed in a second direction (e.g., negative z-axis direction) of the first rim 210. The second segmenting portion 1202 may be disposed closer to the bridge 201 than the third segmenting portion 1203. Some of the first end piece 230 and the first rim 210 separated by the first segmenting portion 1201, the second segmenting portion 1202, and the third segmenting portion 1203 may constitute (provide) a first conductive portion 1210. Some of the first temple 250 separated by the first segmenting portion 1201 may constitute (provide) a second conductive portion 1220.

According to an embodiment, the second temple 260 may include a fourth segmenting portion 1204. The fourth segmenting portion 1204 may be formed adjacent to the second hinge 265. A fifth segmenting portion 1205 may be formed in a first direction (e.g., x-axis direction) of the second rim 220. A sixth segmenting portion 1206 may be formed in a second direction (e.g., negative z-axis direction) of the second rim 220. The fifth segmenting portion 1205 may be disposed closer to the bridge 201 than the sixth segmenting portion 1206. Some of the second end piece 240 and the second rim 220 separated by the fourth segmenting portion 1204, the fifth segmenting portion 1205, and the sixth segmenting portion 1206 may constitute (provide) a third conductive portion 1230. Some of the second temple 260 separated by the fourth segmenting portion 1204 may constitute (provide) a fourth conductive portion 1214.

With reference to FIG. 19B, a printed circuit board 251 (e.g., first printed circuit board 251 in FIG. 2) may be disposed inside the second conductive portion 1220. The printed circuit board 251 may include a wireless communication circuit 305. A feeding point 311 electrically connected to the wireless communication circuit 305 may be disposed in some of the second conductive portion 1220. A first conductive connection member 315 (e.g., C clip) may be disposed at least partially inside the first segmenting portion 1101. The feeding point 311 may be electrically connected to the first conductive connection member 315 and the first conductive portion 1210 through a second conductive connection member 313 (e.g., wiring). Radiation from the feeding point 311 may be directed toward a first direction (e.g., negative x-axis direction) and a second direction (e.g., negative z-axis direction) of the first conductive portion 1210. In an embodiment, as long as the feeding point 311 and the first conductive portion 1210 can be electrically connected, one of the first conductive connection member 315 and the second conductive connection member 313 may be used. In various embodiments, although the printed circuit board 251 has been described as being disposed inside the second conductive portion 1220 of the first temple 250, another printed circuit board (e.g., second printed circuit board 261 in FIG. 2) may be disposed inside the fourth conductive portion 1240 of the second temple 260.

According to various embodiments, the first conductive portion 1210 and the second conductive portion 1220 may be electrically connected to the feeding point 311 of the wireless communication circuit 305, and may function as a first antenna radiator (e.g., first antenna) and a second antenna radiator (e.g., second antenna).

According to an embodiment, the first temple 250 may be folded in a direction where the first rim 210 is disposed (e.g., negative y-axis direction) using the first hinge 255. The second temple 260 may be folded in a direction where the second rim 220 is disposed (e.g., negative y-axis direction) using the second hinge 265.

According to an embodiment, when the second temple 260 is folded first toward the second rim 220, and then the first temple 250 is folded toward the first rim 210, the first segmenting portion 1201 may be disposed to overlap the second segmenting portion 1202, and the fourth segmenting portion 1204 may be disposed to overlap the fifth segmenting portion 1205. When the first segmenting portion 1201 and the second segmenting portion 1202 overlap, and the fourth segmenting portion 1204 and the fifth segmenting portion 1205 overlap, this may reduce degradation in radiation performance of the first conductive portion 1210 (e.g., first antenna) and the second conductive portion 1220 (e.g., second antenna).

Figure 20:
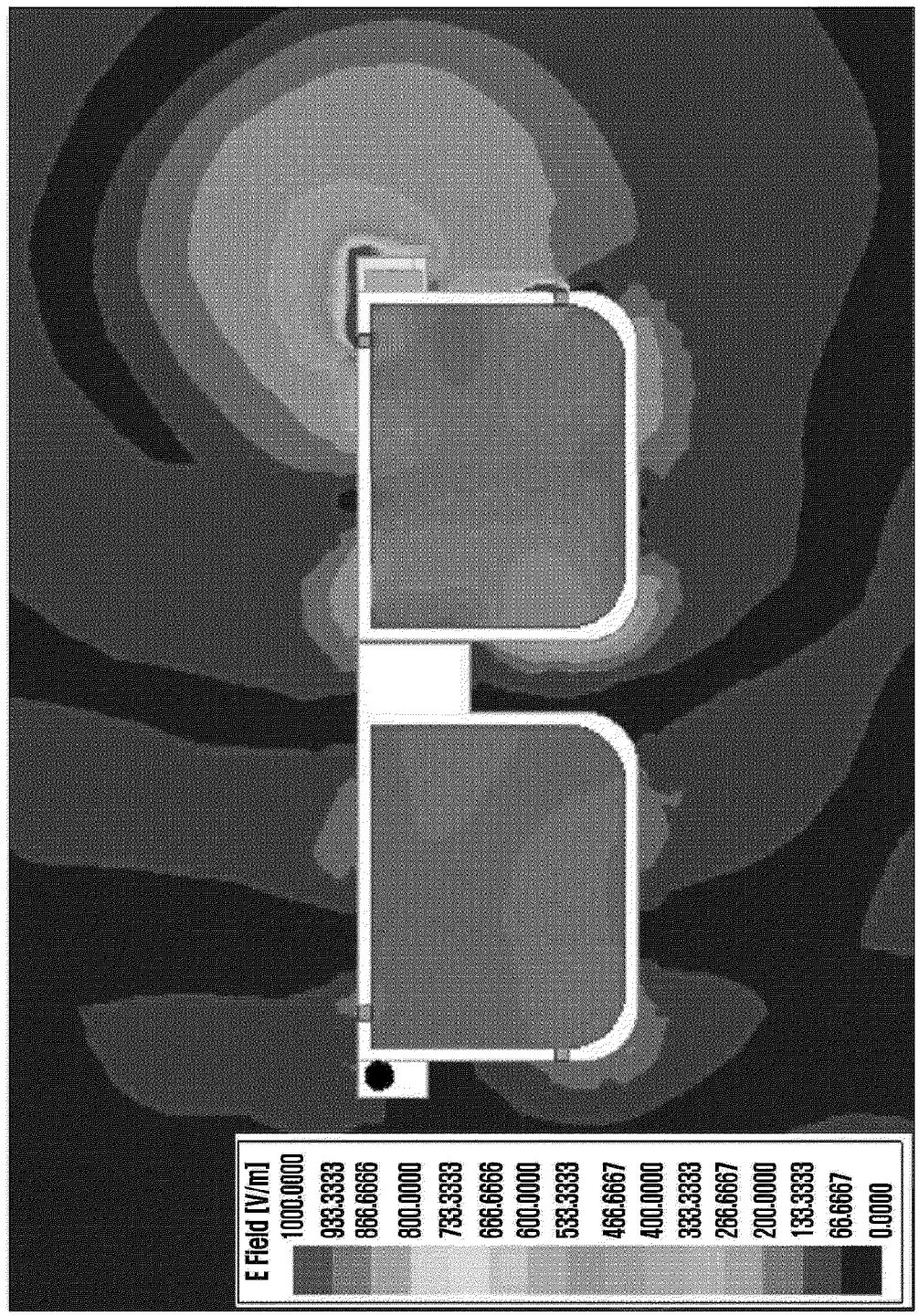
FIG. 20 is a diagram illustrating an electric field of a first conductive portion in the example wearable electronic device shown in FIG. 19A according to various embodiments.
Figure 21:
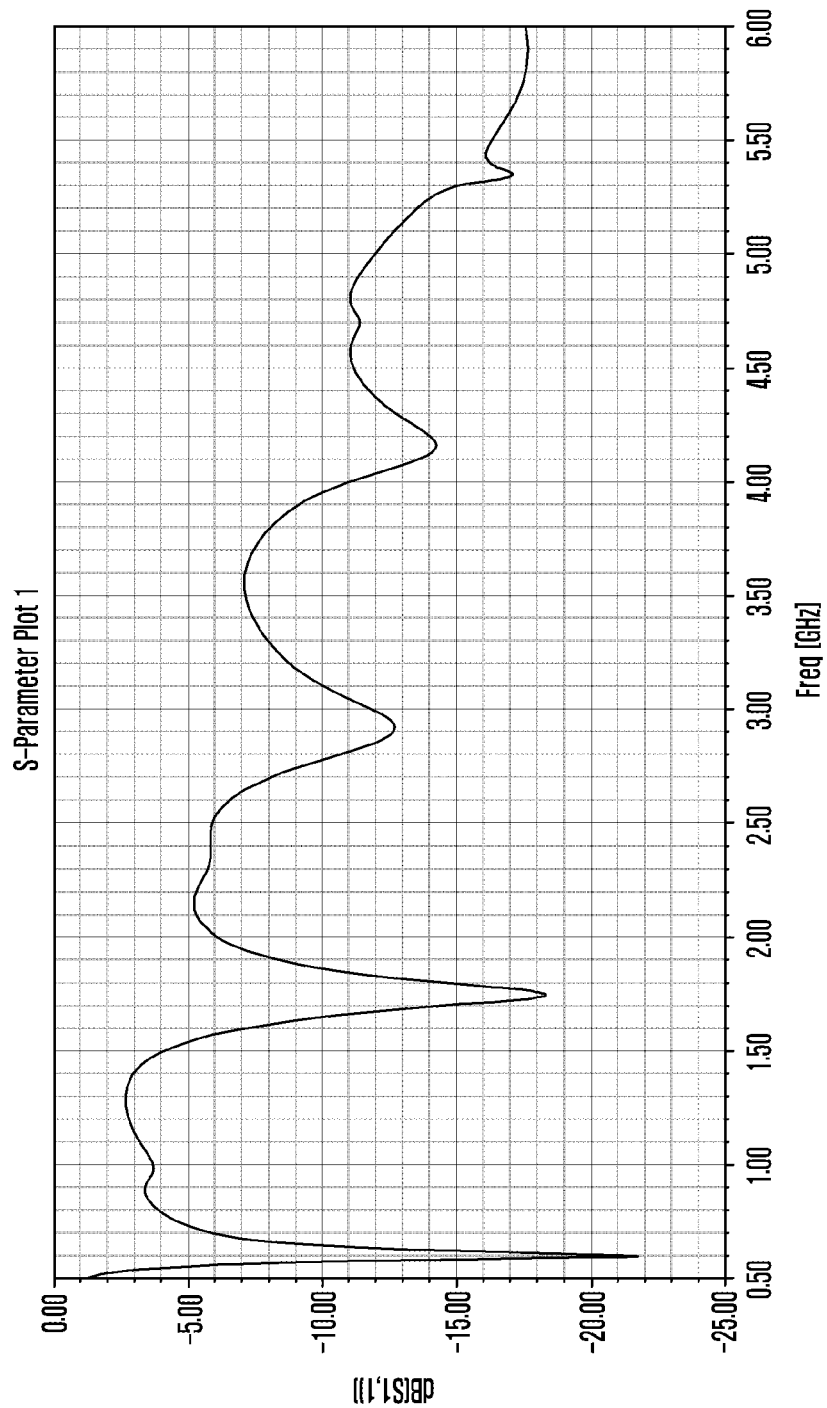
FIG. 21 is a diagram illustrating an S-parameter of the example wearable electronic device shown in FIG. 19A according to various embodiments.

FIG. 20 is a diagram illustrating an electric field of the first conductive portion in the example wearable electronic device shown in FIG. 19A according to various embodiments. FIG. 21 is a diagram illustrating an S-parameter of the example wearable electronic device shown in FIG. 19A according to various embodiments.

With reference to FIG. 20, in the wearable electronic device 200 according to various embodiments of the disclosure, as described in FIG. 19B, the printed circuit board 251 on which the wireless communication circuit 305 is disposed may be included in the second conductive portion 1220, the feeding point 311 electrically connected to the wireless communication circuit 305 may be disposed on some of the second conductive portion 1220, and the second conductive portion 1220 may be electrically connected to the first conductive portion 1210 using at least one conductive connection member (e.g., first conductive connection member 315 and/or second conductive connection member 313). In this case, it can be seen in the wearable electronic device 200 that the strength of the electric field is strongly formed in at least some of the first conductive portion 1210 adjacent to the first segmenting portion 1201 and in at least some of the second conductive portion 1220.

With reference to FIG. 21, on the basis that radiation is possible at about −5 dB or less, it can be seen that the wearable electronic device 200 according to various embodiments of the disclosure can radiate in a frequency band of about 0.5 GHz to 6 GHz using the first conductive portion 1210 and the second conductive portion 1220. For example, when the wearable electronic device 200 according to various embodiments is configured as shown in FIG. 19A, it can be seen that the radiation performance is excellent in the frequency bands of about 0.5 GHz to 0.7 GHz and about 1.6 GHz to 6 GHz.

Figure 22A:
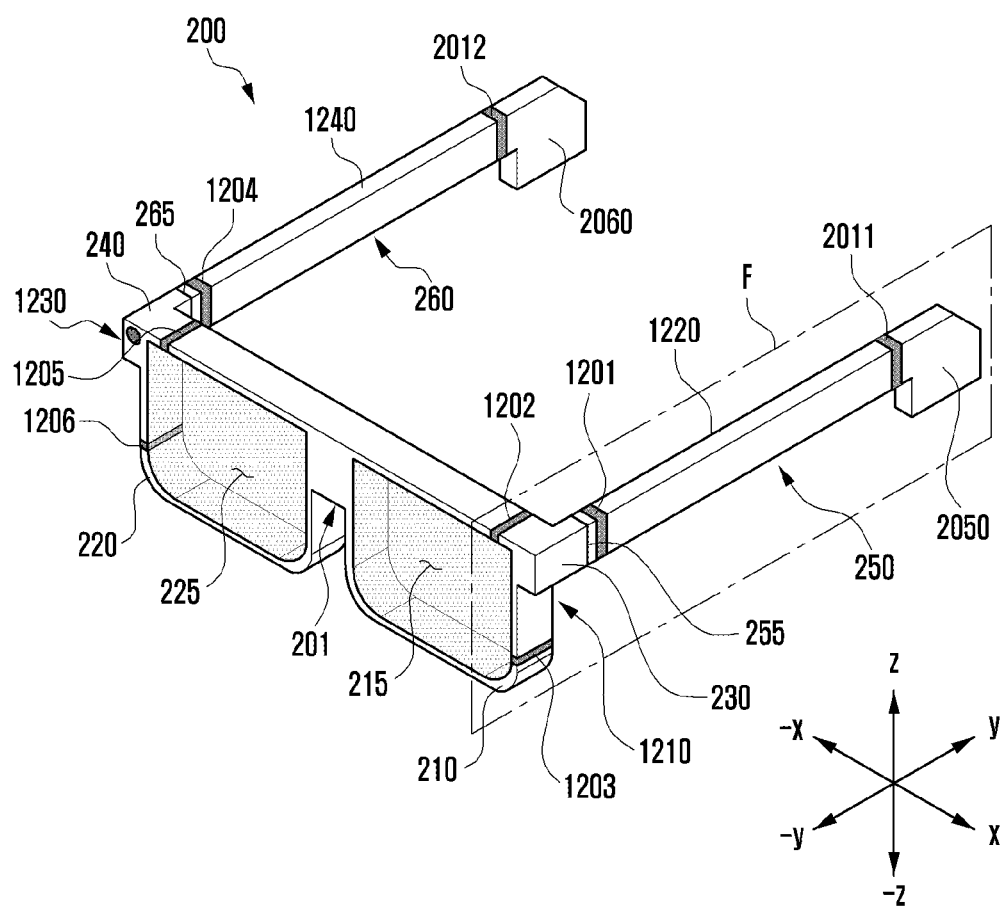
FIG. 22A is a view illustrating an example wearable electronic device including multiple segmenting portions according to various embodiments.
Figure 22B:
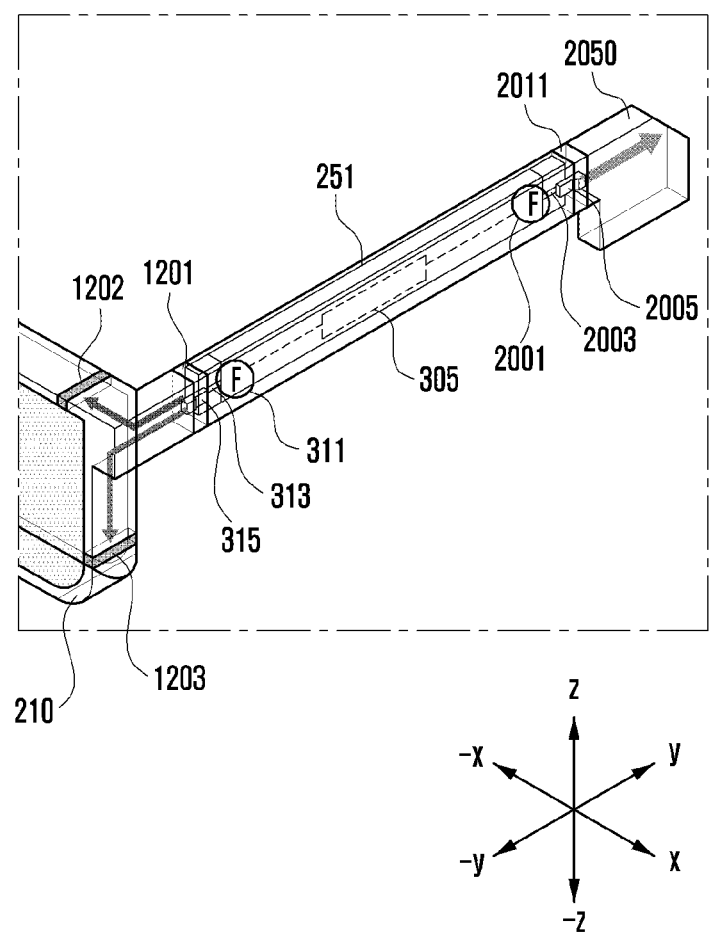
FIG. 22B is an enlarged perspective view of region F of the example wearable electronic device shown in FIG. 22A according to various embodiments.

FIG. 22A is a view illustrating an example wearable electronic device including multiple segmenting portions according to various embodiments. FIG. 22B is an enlarged perspective view of region F of the wearable electronic device shown in FIG. 22A according to various embodiments.

With reference to FIGS. 22A and 22B, in the wearable electronic device 200 according to various embodiments of the disclosure, compared to the embodiment shown in FIG. 19A, the first temple 250 may further include a seventh segmenting portion 2011 and a fifth conductive portion 2050, and the second temple 260 may further include an eighth segmenting portion 2012 and a sixth conductive portion 2060.

According to an embodiment, the first temple 250 may include a first segmenting portion 1201. The first segmenting portion 1201 may be formed adjacent to the first hinge 255. A second segmenting portion 1202 may be formed in a first direction (e.g., negative x-axis direction) of the first rim 210. A third segmenting portion 1203 may be formed in a second direction (e.g., negative z-axis direction) of the first rim 210. The second segmenting portion 1202 may be disposed closer to the bridge 201 than the third segmenting portion 1203. Some of the first end piece 230 and the first rim 210 separated by the first segmenting portion 1201, the second segmenting portion 1202, and the third segmenting portion 1203 may constitute (provide) a first conductive portion 1210. Some of the first temple 250 separated by the first segmenting portion 1201 may constitute (provide) a second conductive portion 1220.

According to an embodiment, the first temple 250 may further include a seventh segmenting portion 2011 and a fifth conductive portion 2050. The seventh segmenting portion 2011 may be formed in a direction adjacent to the temple tip of the first temple 250 (e.g., y-axis direction). The fifth conductive portion 2050 may be disposed to face one end (e.g., temple tip) in a direction (e.g., y-axis direction) from the seventh segmenting portion 2011.

According to an embodiment, the second temple 260 may include a fourth segmenting portion 1204. The fourth segmenting portion 1204 may be formed adjacent to the second hinge 265. A fifth segmenting portion 1205 may be formed in a first direction (e.g., x-axis direction) of the second rim 220. A sixth segmenting portion 1206 may be formed in a second direction (e.g., negative z-axis direction) of the second rim 220. The fifth segmenting portion 1205 may be disposed closer to the bridge 201 than the sixth segmenting portion 1206. Some of the second end piece 240 and the second rim 220 separated by the fourth segmenting portion 1204, the fifth segmenting portion 1205, and the sixth segmenting portion 1206 may constitute (provide) a third conductive portion 1230. Some of the second temple 260 separated by the fourth segmenting portion 1204 may constitute (provide) a fourth conductive portion 1214.

According to an embodiment, the second temple 260 may further include an eighth segmenting portion 2012 and a sixth conductive portion 2060. The eighth segmenting portion 2012 may be formed in a direction (e.g., y-axis direction) adjacent to the temple tip of the second temple 260. The sixth conductive portion 2060 may be disposed to face one end (e.g., temple tip) in a direction (e.g., y-axis direction) from the eighth segmenting portion 2012.

With reference to FIG. 22B, a printed circuit board 251 may be disposed inside the second conductive portion 1220. The printed circuit board 251 may include a wireless communication circuit 305. A first feeding point 311 and a second feeding point 2001 electrically connected to the wireless communication circuit 305 may be disposed in some of the second conductive portion 1220. A first conductive connection member 315 (e.g., C clip) may be disposed at least partially inside the first segmenting portion 2011. The first feeding point 311 may be electrically connected to the first conductive connection member 315 and the first conductive portion 1210 through a second conductive connection member 313 (e.g., wiring). Radiation from the first feeding point 311 may be directed toward a first direction (e.g., negative x-axis direction) and a second direction (e.g., negative z-axis direction) of the first conductive portion 1210.

According to various embodiments, a third conductive connection member 2005 (e.g., C clip) may be disposed at least partially inside the seventh cut-off portion 2011. The second feeding point 2001 may be electrically connected to the third conductive connection member 2005 and the fifth conductive portion 2050 through a fourth conductive connection member 2003 (e.g., wiring). Radiation from the second feeding point 2001 may be directed toward the fifth conductive portion 2050 (e.g., y-axis direction).

According to various embodiments, as long as the first feeding point 311 and the first conductive portion 1210 can be electrically connected, one of the first conductive connection member 315 and the second conductive connection member 313 may be used. As long as the second feeding point 2001 and the fifth conductive portion 2050 can be electrically connected, one of the third conductive connection member 2005 and the fourth conductive connection member 2003 may be used.

Figure 23A:
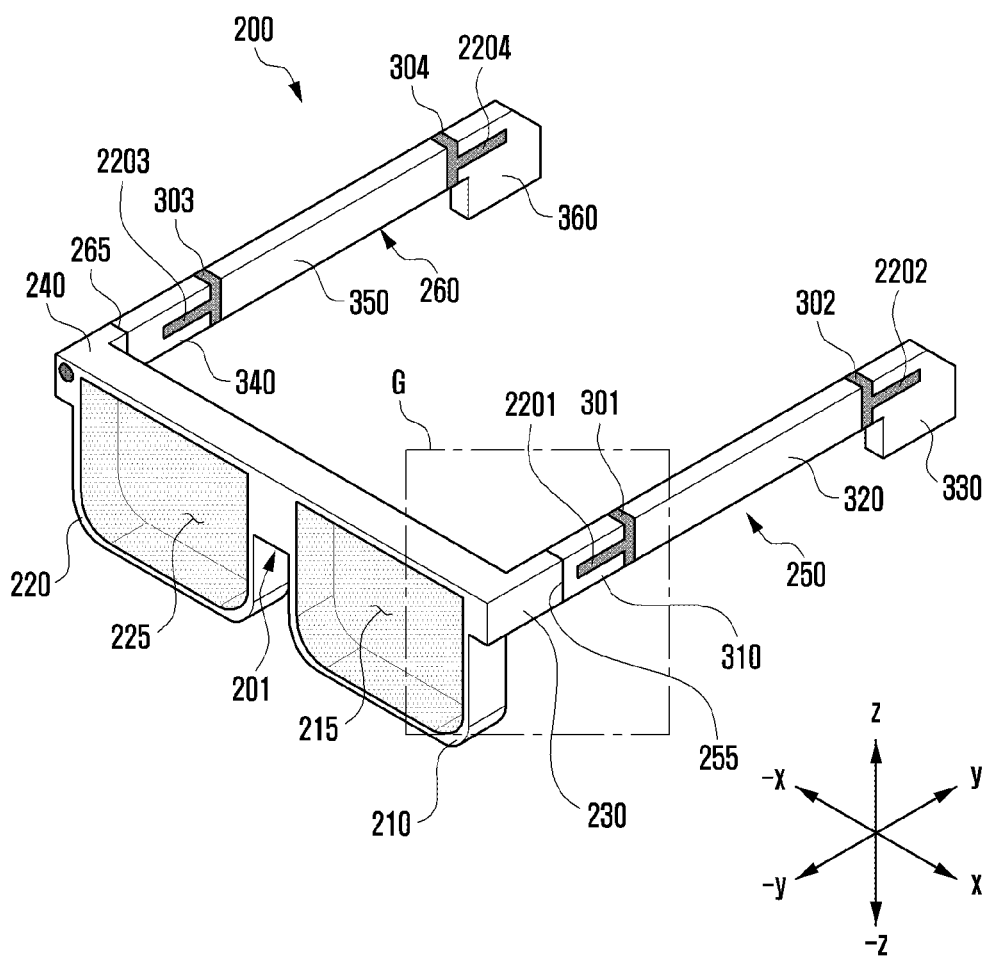
FIG. 23A is a perspective view schematically illustrating an example wearable electronic device including T-shaped segmenting portions according to various embodiments.
Figure 23B:
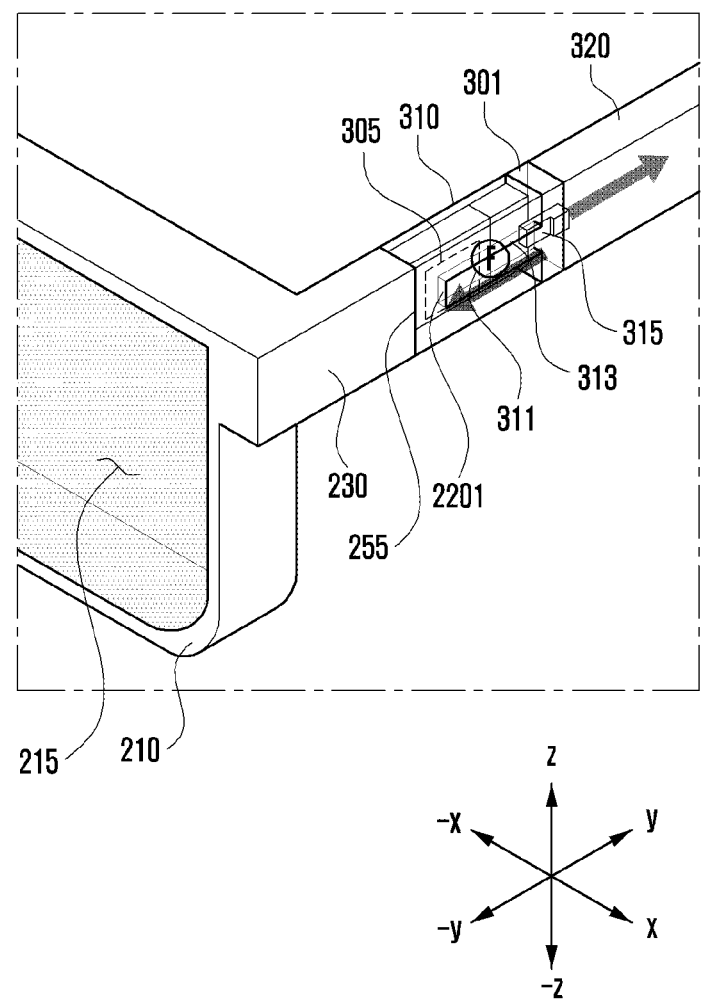
FIG. 23B is an enlarged perspective view of region G of the example wearable electronic device shown in FIG. 23A according to various embodiments.

FIG. 23A is a perspective view schematically illustrating an example wearable electronic device including T-shaped segmenting portions according to various embodiments. FIG. 23B is an enlarged perspective view of region G of the example wearable electronic device shown in FIG. 23A according to various embodiments.

The wearable electronic device 200 of FIGS. 23A and 23B may include, for example, the components described as to the wearable electronic device 200 of FIGS. 3A and 3B.

With reference to FIG. 23A, in the wearable electronic device 200 according to various embodiments of the disclosure, compared to the embodiment shown in FIG. 3A, the first segmenting portion 301 may include a first extension 2201 extended in a first direction (e.g., negative y-axis direction), the second segmenting portion 302 may include a second extension 2202 extended in a second direction (e.g., y-axis direction) opposite to the first direction, the third segmenting portion 303 may include a third extension 2203 extended in the first direction (e.g., negative y-axis direction), and the fourth segmenting portion 304 may include a fourth extension 2204 extended in the second direction (e.g., y-axis direction) opposite to the first direction.

According to an embodiment, the first segmenting portion 301 and the first extension 2201 may be formed in a substantially T-shape when viewed in the first direction (e.g., negative y-axis direction). The second segmenting portion 302 and the second extension 2202 may be formed in a substantially T-shape when viewed in the second direction (e.g., y-axis direction). The third segmenting portion 303 and the third extension 2203 may be formed in a substantially T-shape when viewed in the first direction (e.g., negative y-axis direction). The fourth segmenting portion 304 and the fourth extension 2204 may be formed in a substantially T-shape when viewed in the second direction (e.g., y-axis direction).

According to an embodiment, the first extension 2201 may adjust the electrical length and resonant frequency of the first conductive portion 310. The second extension 2202 may adjust the electrical length and resonant frequency of the third conductive portion 330.

With reference to FIG. 23B, a printed circuit board 251 may be disposed inside the first conductive portion 310. The printed circuit board 251 may include a wireless communication circuit 305. A feeding point 311 electrically connected to the wireless communication circuit 305 may be disposed at some of the first conductive portion 310. A first conductive connection member 315 (e.g., C clip) may be disposed at least partially inside the first segmenting portion 301. The feeding point 311 may be electrically connected to the first conductive connection member 315 and the second conductive portion 320 through a second conductive connection member 313 (e.g., wiring). Radiation from the feeding point 311 may be directed toward the second conductive portion 320 (e.g., y-axis direction) and the first end piece 230 (e.g., negative y-axis direction).

According to an embodiment, the first temple 250 may be folded in a direction in which the first rim 210 is disposed (e.g., negative y-axis direction) using the first hinge 255. The second temple 260 may be folded in a direction in which the second rim 220 is disposed (e.g., negative y-axis direction) using the second hinge 265.

According to various embodiments, when the second temple 260 is folded first toward the second rim 220 and then the first temple 250 is folded toward the first rim 210, the first segmenting portion 301 and the first extension 2201 may be disposed to overlap the fourth segmenting portion 304 and the fourth extension 2204, and the second segmenting portion 302 and the second extension 2202 may be disposed to overlap the third segmenting portion 303 and the third extension 2203.

Figure 24A:
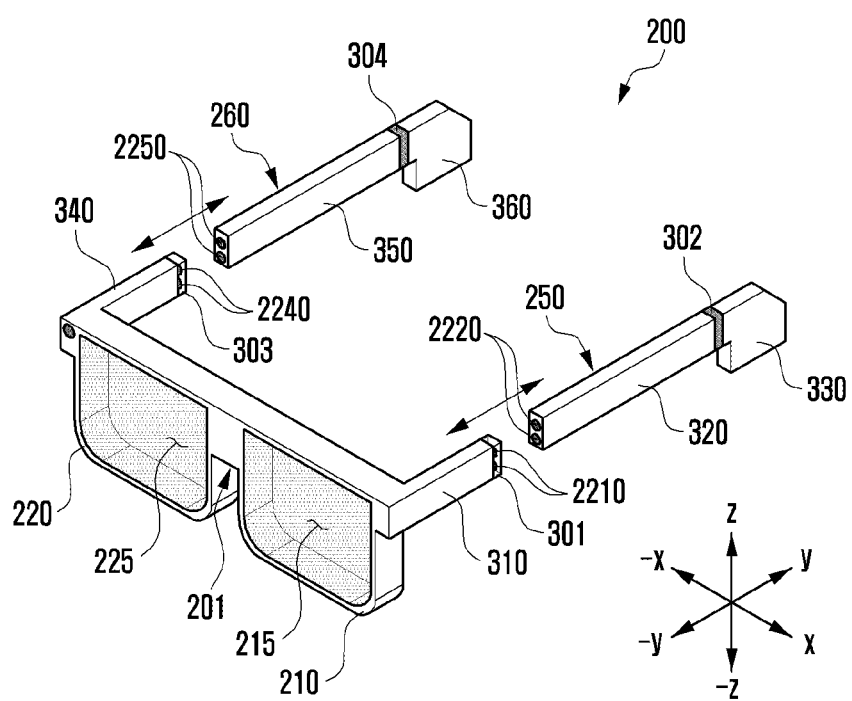
FIG. 24A is a view schematically illustrating an example wearable electronic device with the first temple and second temple separated according to various embodiments.
Figure 24B:
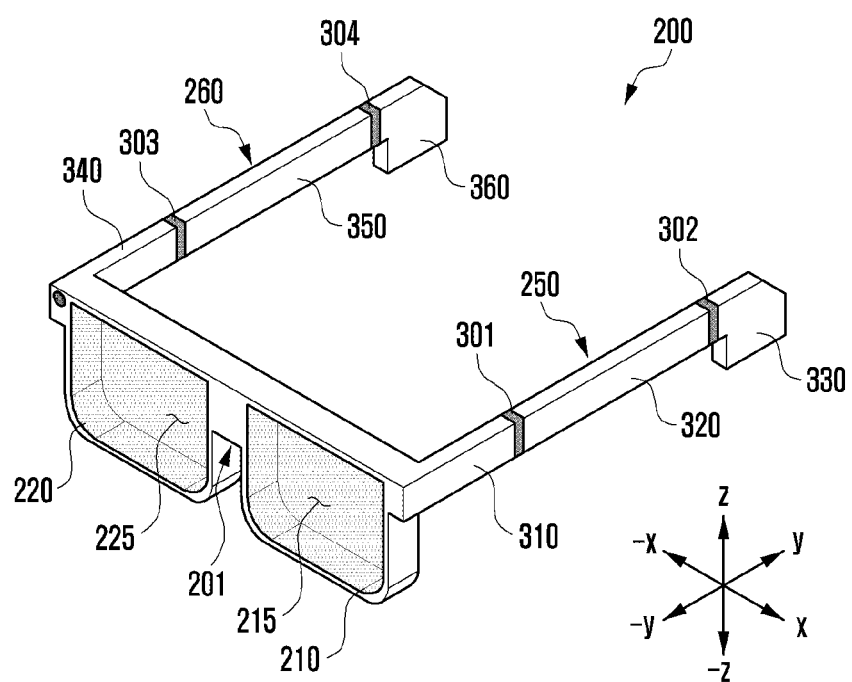
FIG. 24B is a view schematically illustrating an example wearable electronic device with the first temple and second temple combined according to various embodiments.

FIG. 24A is a view schematically illustrating an example wearable electronic device with the first temple and second temple separated according to various embodiments. FIG. 24B is a view schematically illustrating an example wearable electronic device with the first temple and second temple combined according to various embodiments of the disclosure.

The wearable electronic device 200 of FIGS. 24A and 24B may include, for example, the components described as to the wearable electronic device 200 of FIGS. 3A and 3B.

With reference to FIGS. 24A and 24B, the first conductive portion 310 and the second conductive portion 320 formed in the first temple 250 may be separated at the first segmenting portion 301 and spaced apart. The fourth conductive portion 340 and the fifth conductive portion 350 formed in the second temple 260 may be separated at the third segmenting portion 303 and spaced apart.

According to an embodiment, a first magnet 2210 may be disposed at one end (e.g., y-axis direction) of the first conductive portion 310 and/or the first segmenting portion 301. A second magnet 2220 may be disposed at one end (e.g., negative y-axis direction) of the second conductive portion 320. The first conductive portion 310 and the second conductive portion 320 may be detachably coupled using the first magnet 2210 and the second magnet 2220.

According to an embodiment, a third magnet 2240 may be disposed at one end (e.g., y-axis direction) of the fourth conductive portion 340 and/or the third segmenting portion 303. A fourth magnet 2250 may be disposed at one end (e.g., negative y-axis direction) of the fifth conductive portion 350. The fourth conductive portion 340 and the fifth conductive portion 350 may be detachably coupled using the third magnet 2240 and the fourth magnet 2250.

A wearable electronic device 200 according to various embodiments of the disclosure may include: a bridge 201; a first rim 210 disposed in a first direction of the bridge, and a second rim 220 disposed in a second direction of the bridge opposite to the first direction; a first temple 250 configured to be folded or unfolded with respect to the first rim by using a first hinge 255, and a second temple 260 configured to be folded or unfolded with respect to the second rim by using a second hinge 265, wherein the first temple may include a first segmenting portion 1101, and a first conductive portion 1110 and a second conductive portion 1120 separated by the first segmenting portion, wherein the second temple may include a second segmenting portion 1102, and a third conductive portion 1130 and a fourth conductive portion 1140 separated by the second segmenting portion, wherein the first conductive portion 1110 may include a printed circuit board 251 on which a wireless communication circuit 305 is disposed, a feeding point 311 electrically connected to the wireless communication circuit, and at least one conductive connection member 313 and 315 electrically connecting the first conductive portion and the second conductive portion.

According to various embodiments, the bridge 201, the first rim 210, and the second rim 220 may be include non-conductive material.

According to various embodiments, the first conductive portion may function as a first antenna, and the second conductive portion may function as a second antenna.

According to various embodiments, a first conductive connection member 315 may be disposed inside the first segmenting portion, and the first conductive connection member may be electrically connected to the feeding point 311 using a second conductive connection member 313.

According to various embodiments, the first segmenting portion and the second segmenting portion may be symmetrically formed at positions facing each other.

According to various embodiments, the first segmenting portion and the second segmenting portion may be asymmetrically formed at positions not facing each other.

According to various embodiments, when the first temple is folded toward the first rim using the first hinge and the second temple is folded toward the second rim using the second hinge, the first segmenting portion and the second segmenting portion may be arranged to overlap each other.

According to various embodiments, the third conductive portion may include another printed circuit board on which a wireless communication circuit is disposed.

According to various embodiments, the first segmenting portion and the second segmenting portion may include a non-conductive material.

According to various embodiments, the first temple may further include at least one segmenting portion different from the first segmenting portion and at least one conductive portion separated by the at least one segmenting portion, and the second temple may further include at least one segmenting portion different from the second segmenting portion and at least one conductive portion separated by the at least one segmenting portion.

According to various embodiments, the first segmenting portion may include a first extension extended in a first direction, and the second segmenting portion may include a second extension extended in a second direction opposite to the first direction.

According to various embodiments, the first conductive portion may include a first magnet 2210, the second conductive portion may include a second magnet 2220, and the first conductive portion and the second conductive portion may be detachably coupled using the first magnet and the second magnet.

A wearable electronic device 200 according to various embodiments of the disclosure may include: a bridge 201; a first rim 210 disposed in a first direction of the bridge, and a second rim 220 disposed in a second direction of the bridge opposite to the first direction; a first end piece 230 coupled to a portion of the first rim, and a second end piece 240 coupled to a portion of the second rim; a first temple 250 coupled to the first end piece so as to be folded or unfolded with respect to the first rim using a first hinge 255, and a second temple 260 coupled to the second end piece so as to be folded or unfolded with respect to the second rim using a second hinge 265, wherein the first temple may include a second conductive portion 1220 formed using a first segmenting portion 1201, wherein the first rim and the first end piece may include a first conductive portion 1210 formed using a second segmenting portion 1202 formed in a first direction of the first rim and a third segmenting portion 1203 formed in a second direction, and wherein the second conductive portion 1220 may include a printed circuit board 251 on which a wireless communication circuit 305 is disposed, a feeding point 311 electrically connected to the wireless communication circuit, and at least one conductive connection member 313 and 315 electrically connecting the second conductive portion and the first conductive portion.

According to various embodiments, the bridge, the first rim, the second rim, the first end piece, and the second end piece may include conductive material.

According to various embodiments, the second segmenting portion may be disposed closer to the bridge than the third segmenting portion.

According to various embodiments, a first conductive connection member 315 may be disposed inside the first segmenting portion, and the first conductive connection member may be electrically connected to the feeding point 311 using a second conductive connection member 313.

According to various embodiments, the second conductive portion may function as a first antenna, and the first conductive portion may function as a second antenna.

According to various embodiments, when the first temple is folded toward the first rim using the first hinge, the first segmenting portion and the second segmenting portion may be arranged to overlap.

According to various embodiments, the first segmenting portion, the second segmenting portion, and the third segmenting portion may include a non-conductive material.

According to various embodiments, the second temple may include a fourth conductive portion 1240 formed using a fourth segmenting portion 1204, the second rim and the second end piece may include a third conductive portion 1230 formed using a fifth segmenting portion 1205 formed in a first direction of the second rim and a sixth segmenting portion 1206 formed in a second direction, and the fourth conductive portion may include another printed circuit board on which a wireless communication circuit is disposed.

Hereinabove, the disclosure has been described in terms of various embodiments of the disclosure, but it should be understood by those skilled in the art that many variations and modifications of the basic inventive concept described herein will still fall within the scope of the disclosure.

While the disclosure has been illustrated and described with reference to various example embodiments, it will be understood that the various ex ample embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) de scribed herein may be used in conjunction with any other embodiment(s) described herein.

What is claimed is:

1. A wearable electronic device comprising:
a bridge;
a first rim disposed in a first direction of the bridge, and a second rim disposed in a second direction of the bridge opposite to the first direction; and
a first temple configured to be folded or unfolded with respect to the first rim via a first hinge, and a second temple configured to be folded or unfolded with respect to the second rim via a second hinge,
wherein the first temple includes a first conductive portion and a second conductive portion separated by a first segmenting portion,
wherein the second temple includes a third conductive portion and a fourth conductive portion separated by a second segmenting portion,
wherein the first conductive portion includes a first printed circuit board on which a first wireless communication circuit is disposed, a feeding point electrically connected to the first wireless communication circuit, and at least one conductive connector electrically connecting the first conductive portion and the second conductive portion, and
wherein at least a portion of the first segmenting portion and at least a portion of the second segmenting portion overlap each other when the first temple is folded toward the first rim and the second temple is folded toward the second rim.

2. The wearable electronic device of claim 1, wherein the bridge, the first rim, and the second rim include a non-conductive material.

3. The wearable electronic device of claim 1, wherein the first conductive portion functions as a first antenna, and the second conductive portion functions as a second antenna.

4. The wearable electronic device of claim 1,
wherein the at least one conductive connector includes a first conductive connector is disposed inside the first segmenting portion, and
wherein the first conductive connector is electrically connected to the feeding point via a second conductive connector.

5. The wearable electronic device of claim 1, wherein the first segmenting portion and the second segmenting portion are symmetrically formed at positions facing each other.

6. A wearable electronic device comprising:
a bridge;
a first rim disposed in a first direction of the bridge, and a second rim disposed in a second direction of the bridge opposite to the first direction; and
a first temple configured to be folded or unfolded with respect to the first rim via a first hinge, and a second temple configured to be folded or unfolded with respect to the second rim via a second hinge,
wherein the first temple includes a first conductive portion and a second conductive portion separated by a first segmenting portion,
wherein the second temple includes a third conductive portion and a fourth conductive portion separated by a second segmenting portion,
wherein the first conductive portion includes a first printed circuit board on which a first wireless communication circuit is disposed, a feeding point electrically connected to the first wireless communication circuit, and at least one conductive connector electrically connecting the first conductive portion and the second conductive portion, and
wherein the first segmenting portion and the second segmenting portion are asymmetrically formed at positions not facing each other.

7. The wearable electronic device of claim 1, wherein the third conductive portion includes a second printed circuit board on which a second wireless communication circuit is disposed.

8. The wearable electronic device of claim 1, wherein the first segmenting portion and the second segmenting portion include non-conductive material.

9. The wearable electronic device of claim 1, wherein:
the first temple further includes at least one third segmenting portion different from the first segmenting portion and at least one third conductive portion separated by the at least one third segmenting portion; and
the second temple further includes at least one fourth segmenting portion different from the second segmenting portion and at least one fourth conductive portion separated by the at least one fourth segmenting portion.

10. The wearable electronic device of claim 9, wherein the first segmenting portion includes a first extension extended in a third direction, and the at least one third segmenting portion includes a second extension extended in a fourth direction opposite to the third direction.

11. The wearable electronic device of claim 1, wherein the first conductive portion includes a first magnet, the second conductive portion includes a second magnet, and the first conductive portion and the second conductive portion are detachably coupled using the first magnet and the second magnet.

12. A wearable electronic device comprising:
a bridge;
a first rim disposed in a first direction of the bridge, and a second rim disposed in a second direction of the bridge opposite to the first direction;
a first end piece coupled to a portion of the first rim, and a second end piece coupled to a portion of the second rim; and
a first temple coupled to the first end piece and configured to be folded or unfolded with respect to the first rim via a first hinge, and a second temple coupled to the second end piece and configured to be folded or unfolded with respect to the second rim via a second hinge,
wherein the first temple includes a second conductive portion formed using a first segmenting portion,
wherein the first rim and the first end piece include a first conductive portion formed using a second segmenting portion formed in a first direction of the first rim and a third segmenting portion formed in a second direction,
wherein the second conductive portion includes a printed circuit board on which a wireless communication circuit is disposed, a feeding point electrically connected to the wireless communication circuit, and at least one conductive connection member electrically connecting the second conductive portion and the first conductive portion.

13. The wearable electronic device of claim 12, wherein the bridge, the first rim, the second rim, the first end piece, and the second end piece include conductive material.

14. The wearable electronic device of claim 12, wherein the second segmenting portion is disposed closer to the bridge than the third segmenting portion.

15. The wearable electronic device of claim 12, wherein:
a first conductive connection member is disposed inside the first segmenting portion; and
the first conductive connection member is electrically connected to the feeding point using a second conductive connection member.

16. The wearable electronic device of claim 12, wherein the second conductive portion functions as a first antenna, and the first conductive portion functions as a second antenna.

17. The wearable electronic device of claim 12, wherein at least a portion of the first segmenting portion and at least a portion of the second segmenting portion overlap each other when the first temple is folded toward the first rim and the second temple is folded toward the second rim.

18. The wearable electronic device of claim 12, wherein the first segmenting portion, the second segmenting portion, and the third segmenting portion include non-conductive material.

19. The wearable electronic device of claim 12, wherein:
the second temple includes a fourth conductive portion formed using a fourth segmenting portion;
the second rim and the second end piece include a third conductive portion formed using a fifth segmenting portion formed in a first direction of the second rim and a sixth segmenting portion formed in a second direction; and
the fourth conductive portion includes another printed circuit board on which a wireless communication circuit is disposed.

* * * * *